(12) United States Patent
Harada et al.

(10) Patent No.: US 7,705,886 B2
(45) Date of Patent: Apr. 27, 2010

(54) INFORMATION PROCESSING APPARATUS AND METHOD, RECORDING MEDIUM, PROGRAM, AND DISPLAY DEVICE

(75) Inventors: Tsutomu Harada, Kanagawa (JP); Hirotoshi Fujisawa, Kanagawa (JP); Kyohei Iwamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 945 days.

(21) Appl. No.: 11/074,200

(22) Filed: Mar. 8, 2005

(65) Prior Publication Data

US 2005/0226319 A1 Oct. 13, 2005

(30) Foreign Application Priority Data

Mar. 19, 2004 (JP) ............................. 2004-080031
May 24, 2004 (JP) ............................. 2004-153017

(51) Int. Cl.
*H04N 13/02* (2006.01)
*H04N 13/04* (2006.01)
*H04N 5/232* (2006.01)

(52) U.S. Cl. ...................... 348/211.12; 348/46; 348/51
(58) Field of Classification Search ............. 348/14.01, 348/14.18, 14.12, 211.12, 333.01, 42, 46, 348/49, 51, 54
See application file for complete search history.

(56) References Cited

U.S. PATENT DOCUMENTS

| | | | | |
|---|---|---|---|---|
| 4,583,122 A | * | 4/1986 | Ohwada et al. | ............. 348/792 |
| 5,696,371 A | * | 12/1997 | Meyers | ..................... 250/208.1 |
| 5,977,535 A | * | 11/1999 | Rostoker | ................. 250/208.1 |
| 6,148,149 A | * | 11/2000 | Kagle | .......................... 396/50 |
| 6,177,950 B1 | * | 1/2001 | Robb | ...................... 348/14.01 |
| 6,765,962 B1 | * | 7/2004 | Lee et al. | ............... 375/240.03 |
| 6,816,198 B1 | * | 11/2004 | Suzuki | ....................... 348/294 |
| 6,917,981 B1 | * | 7/2005 | Buck et al. | .................. 709/230 |
| 2003/0071932 A1 | * | 4/2003 | Tanigaki | ...................... 349/61 |
| 2003/0193599 A1 | * | 10/2003 | Campbell et al. | ...... 348/333.01 |
| 2004/0070666 A1 | * | 4/2004 | Bober et al. | ............. 348/14.01 |

(Continued)

FOREIGN PATENT DOCUMENTS

JP 6-153239 5/1994

(Continued)

OTHER PUBLICATIONS

Arai et al.; "Gradient-index lens-array method based on real-time integral photography for three-dimensional images"; Apr. 10, 1998; Applied Optics; vol. 7, No. 11; pp. 2034-2045.*

*Primary Examiner*—Timothy J Henn
(74) *Attorney, Agent, or Firm*—Oblon, Spivak, McClelland, Maier & Neustadt, L.L.P.

(57) ABSTRACT

An information processing apparatus for controlling a display device, includes: an acquisition unit acquiring an image of a subject formed in an image capture area made of a plurality of pixels performing an image capture operation, based on outputs from pixels constituting an image capture area; a transmitter transmitting data of the acquired image data to an other information processing apparatus controlling an other display device having the same construction as the display device; a receiver receiving data of an image of other subject transmitted from the other information processing apparatus; and a display controller displaying the image of the other subject in a display area based on the received image data.

21 Claims, 29 Drawing Sheets

U.S. PATENT DOCUMENTS

2006/0256436 A1* 11/2006 Javidi .................. 359/466

FOREIGN PATENT DOCUMENTS

| JP | 6-160770 | 6/1994 |
|----|----------|--------|
| JP | 8-317429 | 11/1996 |
| JP | 11-234702 | 8/1999 |
| JP | 2002-218505 | 8/2002 |
| JP | 2005-94386 | 4/2005 |
| JP | 2005-202153 | 7/2005 |

\* cited by examiner

MICROLENS

PIXEL
MICROLENS

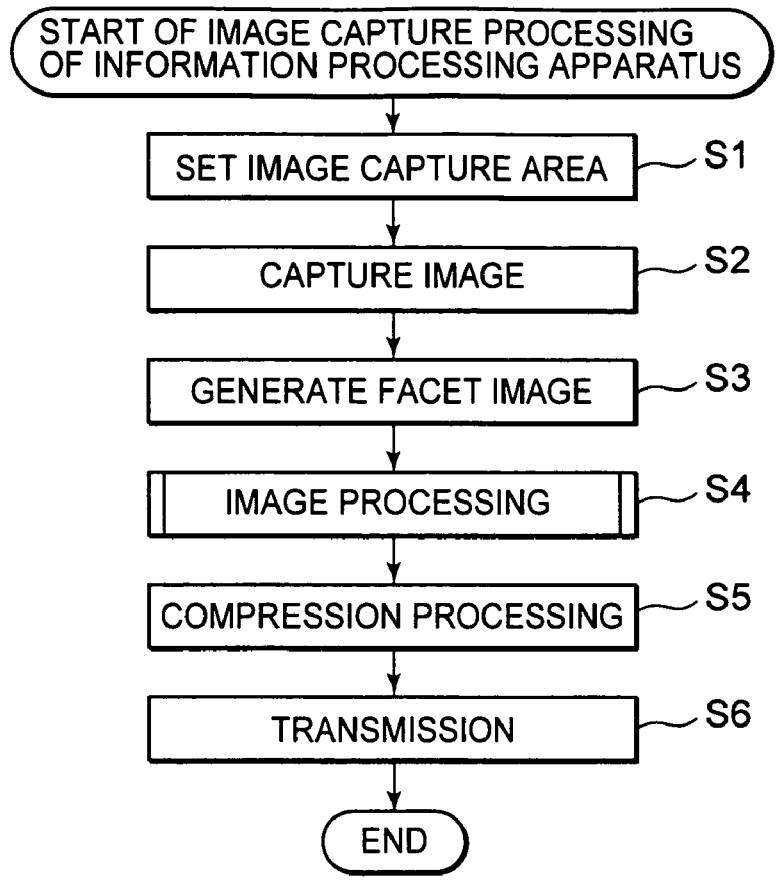
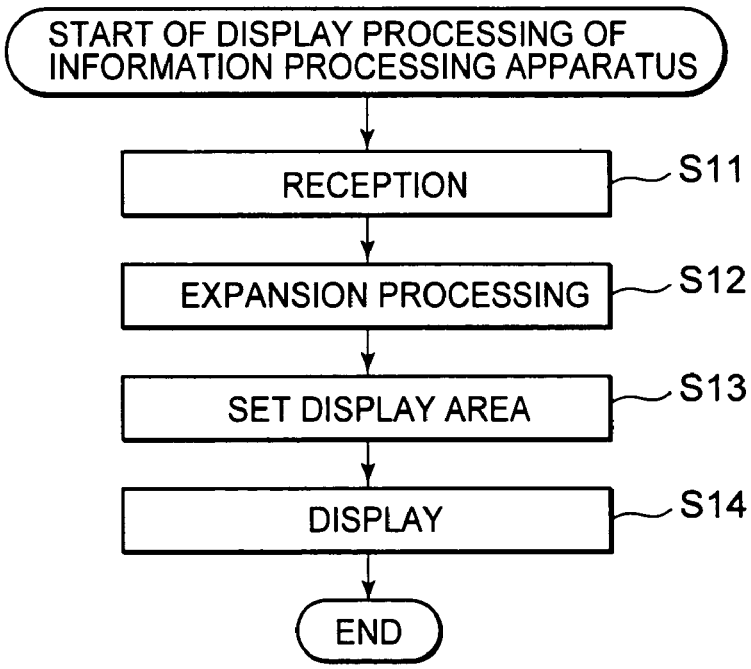

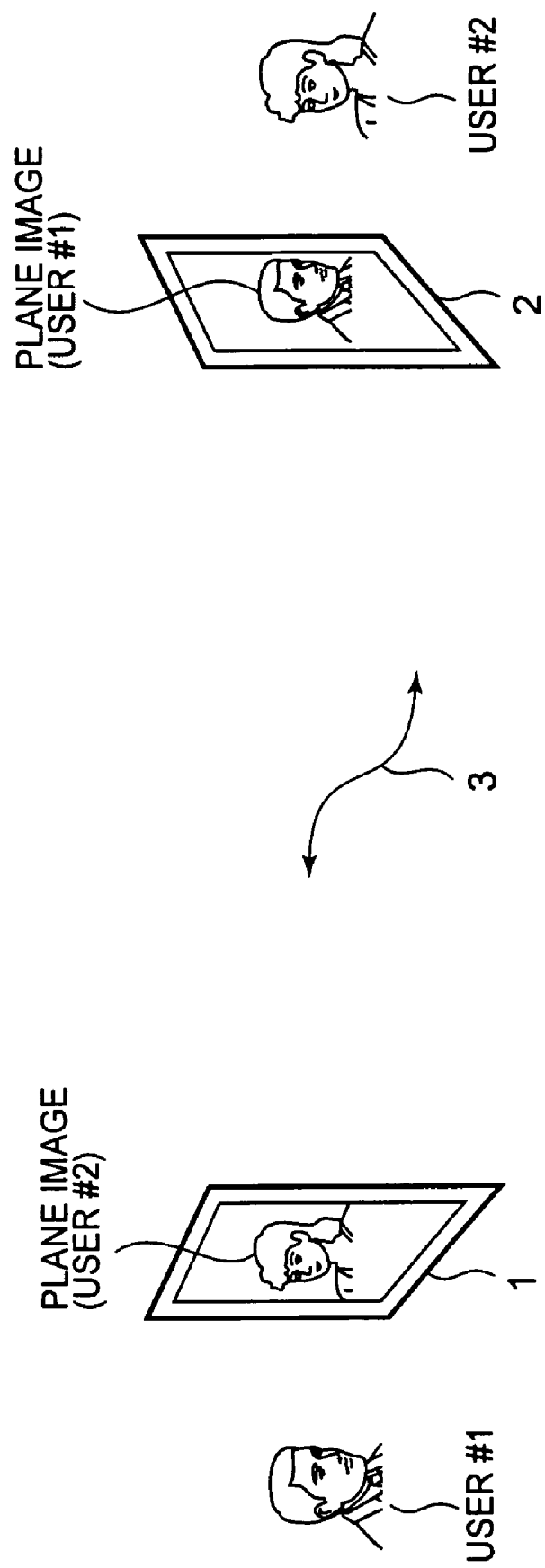

FIG. 25
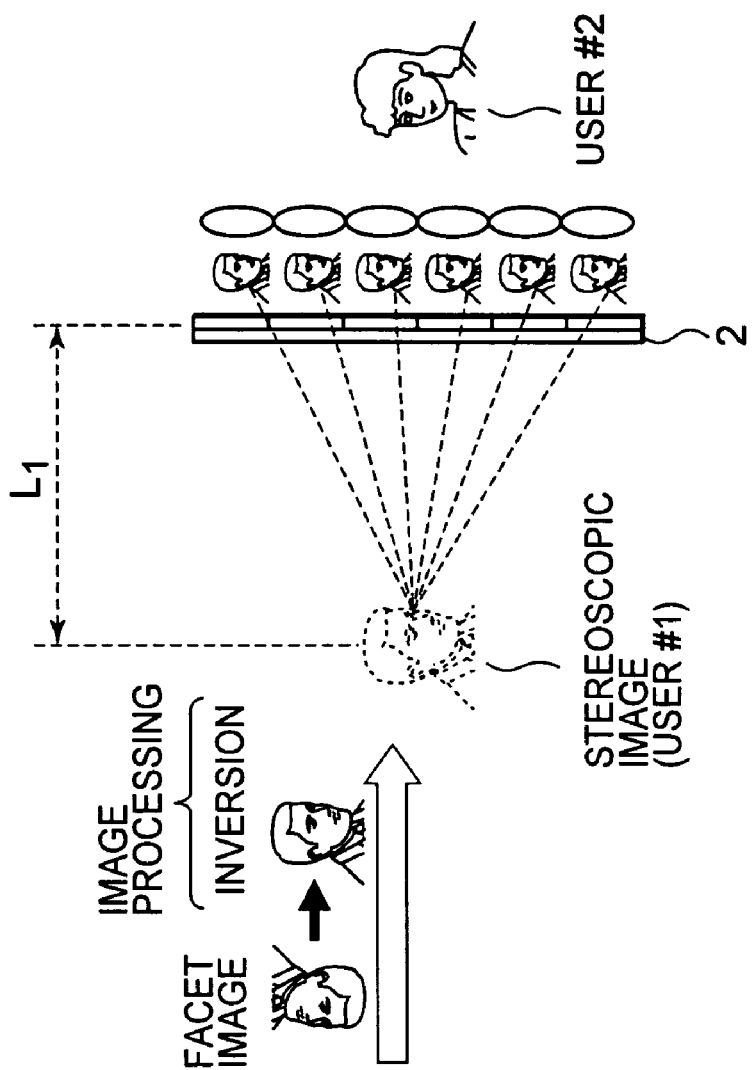
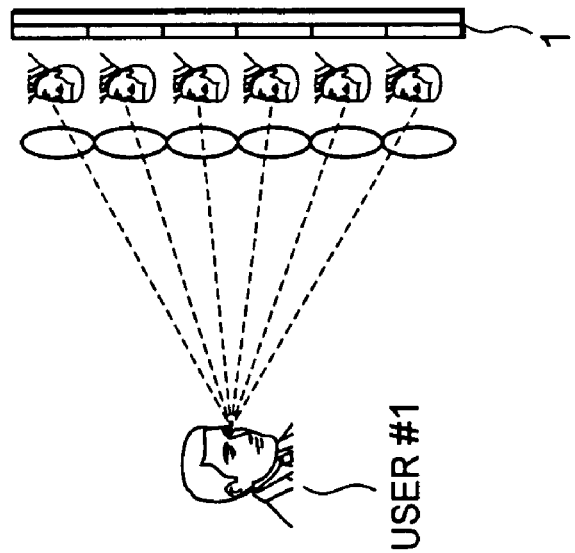

2

2

2

INFORMATION PROCESSING APPARATUS AND METHOD, RECORDING MEDIUM, PROGRAM, AND DISPLAY DEVICE

BACKGROUND OF THE INVENTION

1. Field of the Invention

The present invention relates to an information processing apparatus and method, a recording medium, a program and a display device and, more particularly, to an information processing apparatus and method, a recording medium, a program and a display device all of which enable users to perform communication in a more natural way.

2. Description of Related Art

As a so-called full parallax image presentation system in which viewpoints can be selected, there is, for example, an IP (Integral Photography) stereoscopic image system.

The principles of an IP technique used in the IP stereoscopic image system have already been proposed in the early twentieth century.

Namely, IP is a technique in which a plurality of small images of a subject obtained by performing photography via a lens array such as the compound multifaceted eyes of insects are formed on a photographic plate, the photographic plate is illuminated from the position opposite to the position of the subject across the photographic plate, and light rays is reproduced which trace in the reverse direction the same trajectories as light rays propagating from the subject to the photographic plate during photography, thereby reproducing a three-dimensional image of the subject at the position where the subject was situated.

The IP stereoscopic image system is a system which electronically realizes this IP technique by using a digital camera, a liquid crystal display or the like. Accordingly, the IP stereoscopic image system is basically made of a digital camera having a lens array disposed in the front section, and a liquid crystal display having a lens array disposed on the surface and performing reproduction of an image of a subject.

Patent Document 1 (Japanese Patent Application Publication No. 2004-54153) discloses an image capture and display device for stereoscopic images using IP. This image capture and display device is constructed to obtain a stereoscopic image of a subject by causing light which enters from the subject into an image capture optical fiber to exit from the side of the device opposite to the subject across the image capture and display device. A display lens is disposed on the light exiting side of the device.

Patent Document 2 (Japanese Patent Application Publication No. 2004-23203) discloses a technique which captures light rays from a subject reflected by a prismatic mirror group, by means of a camera, and acquires a subject image of high spatial resolution. Patent Document 2 also discloses that images captured by this technique are used for providing a stereoscopic image of high spatial resolution in real time, whereby a stereoscopic display system is realized.

SUMMARY OF THE INVENTION

However, if the IP stereoscopic image system is to realized, the trajectories of light rays entering from a subject during photography need to be made coincident with the trajectories of light rays propagating in the reverse direction during reproduction, so that there is the drawback that the positional relationship between the digital camera and the lens array is required to be accurately reproduced as the positional relationship between the liquid crystal display and the lens array. Accordingly, a system which is realized to meet this demand undergoes considerable limitations in terms of techniques or costs.

As a matter of course, the construction of an image capture system made of the digital camera and the lens array and the construction of an reproduction system made of the liquid crystal display and the lens array need to be separately prepared, so that there is also the drawback that the system construction becomes not only costly but comparatively large.

There is a videophone system which can be realized by the application of the IP stereoscopic image system and is known as a communication tool which has recently started to be incorporated into mobile phones and be widely used. This videophone system is pointed out to have the drawback that, for example, the eyes of one of two users who are communicating with each other cannot catch the eyes of the other.

Namely, a digital camera and a display are disposed at different positions of each device for video telephony, so that when a user A sees the face of another user B who is displayed on the display of the user A's device, the face of the user A (communication party) who is facing to the display of the user A's device is displayed on the display of the other user B.

In addition, the user A sees the digital camera of user A's device so that the face of the user A can be displayed on the display of the other user B's device as if the user A were steadily looking at the other user B's face, the user A cannot, of course, look at the other B's face which is displayed on the display of user A's device.

The present invention has been made in view of the above-mentioned situations, and intends to enable communication parties to perform communication in a more natural way.

According to a first aspect of the present invention, there is provided an information processing apparatus for controlling a display device, which is constituted by pixels each switchable between an image display operation and an image capture operation according to an applied voltage and has a lens array provided on a surface of the display device. The information processing apparatus includes: acquisition means for acquiring an image of a subject formed in an image capture area made of a plurality of pixels performing the image capture operation, on the basis of outputs from the pixels constituting the image capture area; transmission means for transmitting data of the image of the subject acquired by the acquisition means to another information processing apparatus controlling an other display device having the same construction as the display device; reception means for receiving data of an image of an other subject transmitted from the other information processing apparatus; and display control means for displaying, on the basis of the data of the image of the other subject received by the reception means, the image of the other subject in a display area which is made of a plurality of pixels performing the image display operation and is formed at a position of the display device which corresponds to a position of the other display device where the image of the other subject is formed.

The acquisition means is capable of acquiring data of a plurality of images of the subject on the basis of outputs from pixels constituting a plurality of image capture areas.

The display control means is capable of displaying a plurality of images of the other subject in a plurality of display areas on the basis of data of a plurality of images of the other subject received by the reception means.

The image capture area and the display area can be formed at different positions of the display device so that the position of each of the image capture area and the display area is moved sequentially.

The information processing apparatus according to the first aspect further includes conversion means for converting the image of the subject acquired by the acquisition means into an erected image. In this case, the transmission means transmits data of the erected image of the subject converted by the conversion means to the other information processing apparatus.

The information processing apparatus according to the first aspect further includes enlargement/reduction processing means for enlarging or reducing the image of the subject converted into the erected image.

The information processing apparatus according to the first aspect further includes conversion means for converting the image of the other subject whose data is received by the reception means into an erected image. In this case, the display control means displays the erected image of the other subject converted by the conversion means in the display area.

The information processing apparatus according to the first aspect further includes enlargement/reduction processing means for enlarging or reducing the image of the subject which is converted into the erected image by the conversion means.

The information processing apparatus according to the first aspect further includes compression means for compressing data of a first image of the subject acquired by the acquisition means, by using a difference between the first image of the subject and a second image of the subject which serves as a reference. In this case, the transmission means transmits the data of the first image of the subject compressed by the compression means to the other information processing apparatus together with data of the second image of the subject.

The information processing apparatus according to the first aspect further includes: generation means for generating data of a second image of the other subject on the basis of data of a first image of the other subject and a difference between the first and second images of the other subject if the reception means receives the data of the first image of the other subject which serves as a reference; and the data of the second image of the other subject represented by a difference from the first image of the other subject.

According to a second aspect of the present invention, there is provided an information processing method of an information processing apparatus for controlling a display device, which is constituted by pixels each switchable between an image display operation and an image capture operation according to an applied voltage and has a lens array provided on a surface of the display device. The information processing method includes: an acquisition step of acquiring an image of a subject formed in an image capture area made of a plurality of pixels performing the image capture operation, on the basis of outputs from the pixels constituting the image capture area; a transmission step of transmitting data of the image of the subject acquired by the processing of the acquisition step to an other information processing apparatus controlling an other display device having the same construction as the display device; a reception step of receiving data of an image of an other subject transmitted from the other information processing apparatus; and a display control step of displaying, on the basis of the data of the image of the other subject received by the processing of the reception step, the image of the other subject in a display area which is made of a plurality of pixels performing the image display operation and is formed at a position of the display device which corresponds to a position of the other display device where the image of the other subject is formed.

According to a third aspect of the present invention, there is provided a recording medium on which is recorded a program which causes a computer to execute a process for controlling a display device, which is constituted by pixels each switchable between an image display operation and an image capture operation according to an applied voltage and has a lens array provided on a surface of the display device. The program includes: an acquisition step of acquiring an image of a subject formed in an image capture area made of a plurality of pixels performing the image capture operation, on the basis of outputs from the pixels constituting the image capture area; a transmission step of transmitting data of the image of the subject acquired by the processing of the acquisition step to an other information processing apparatus controlling an other display device having the same construction as the display device; a reception step of receiving data of an image of an other subject transmitted from the other information processing apparatus; and a display control step of displaying, on the basis of the data of the image of the other subject received by the processing of the reception step, the image of the other subject in a display area which is made of a plurality of pixels performing the image display operation and is formed at a position of the display device which corresponds to a position of the other display device where the image of the other subject is formed.

According to a fourth aspect of the present invention, there is provided a program which causes a computer to execute a process for controlling a display device, which is constituted by pixels each switchable between an image display operation and an image capture operation according to an applied voltage and has a lens array provided on a surface of the display device. The program includes: an acquisition step of acquiring an image of a subject formed in an image capture area made of a plurality of pixels performing the image capture operation, on the basis of outputs from the pixels constituting the image capture area; a transmission step of transmitting data of the image of the subject acquired by the processing of the acquisition step to an other information processing apparatus controlling an other display device having the same construction as the display device; a reception step of receiving data of an image of an other subject transmitted from the other information processing apparatus; and a display control step of displaying, on the basis of the data of the image of the other subject received by the processing of the reception step, the image of the other subject in a display area which is made of a plurality of pixels performing the image display operation and is formed at a position of the display device which corresponds to a position of the other display device where the image of the other subject is formed.

According to a fifth aspect of the present invention, there is provided an information processing apparatus for controlling a display device, which is constituted by pixels each switchable between an image display operation and an image capture operation according to an applied voltage and has a lens array provided on a surface of the display device. The information processing apparatus includes: acquisition means for acquiring an image of a subject formed in an image capture area made of a plurality of pixels performing the image capture operation, on the basis of outputs from the pixels constituting the image capture area; and transmission means for transmitting data of the image of the subject acquired by the acquisition means to an other information processing apparatus controlling an other display device having the same construction as the display device.

According to a sixth aspect of the present invention, there is provided an information processing method of an information processing apparatus for controlling a display device, which is constituted by pixels each switchable between an image display operation and an image capture operation according to an applied voltage and has a lens array provided on a surface of the display device. The information processing method includes: an acquisition step of acquiring an image of a subject formed in an image capture area made of a plurality of pixels performing the image capture operation, on the basis of outputs from the pixels constituting the image capture area; and a transmission step of transmitting data of the image of the subject acquired by the processing of the acquisition step to an other information processing apparatus controlling an other display device having the same construction as the display device.

According to a seventh aspect of the present invention, there is provided a recording medium on which is recorded a program which causes a computer to execute a process for controlling a display device, which is constituted by pixels each switchable between an image display operation and an image capture operation according to an applied voltage and controls and has a lens array provided on a surface of the display device. The program includes: an acquisition step of acquiring an image of a subject formed in an image capture area made of a plurality of pixels performing the image capture operation, on the basis of outputs from the pixels constituting the image capture area; and a transmission step of transmitting data of the image of the subject acquired by the processing of the acquisition step to an other information processing apparatus controlling an other display device having the same construction as the display device.

According to an eighth aspect of the present invention, there is provided a program which causes a computer to execute a process for controlling a display device, which is constituted by pixels each switchable between an image display operation and an image capture operation according to an applied voltage and has a lens array provided on a surface of the display device. The program includes: an acquisition step of acquiring an image of a subject formed in an image capture area made of a plurality of pixels performing the image capture operation, on the basis of outputs from the pixels constituting the image capture area; and a transmission step of transmitting data of the image of the subject acquired by the processing of the acquisition step to an other information processing apparatus controlling an other display device having the same construction as the display device.

According to a ninth aspect of the present invention, there is provided an information processing apparatus for controlling a display device, which is constituted by pixels each switchable between an image display operation and an image capture operation according to an applied voltage and has a lens array provided on a surface of the display device. The information processing apparatus includes: reception means for receiving data of an image of an other subject transmitted from an other information processing apparatus which controls an other display device having the same construction as the display device; and display control means for displaying, on the basis of the data of the image of the other subject received by the reception means, the image of the other subject in a display area which is made of a plurality of pixels performing the image display operation and is formed at a position of the display device which corresponds to a position of the other display device where the image of the other subject is formed.

According to a tenth aspect of the present invention, there is provided an information processing method of an information processing apparatus for controlling a display device, which has pixels each switchable between an image display operation and an image capture operation according to an applied voltage and has a lens array provided on a surface of the display device. The information processing method includes: a reception step of receiving data of an image of an other subject transmitted from an other information processing apparatus which controls an other display device having the same construction as the display device; and a display control step of displaying, on the basis of the data of the image of the other subject received by the processing of the reception step, the image of the other subject in a display area which is made of a plurality of pixels performing the image display operation and is formed at a position of the display device which corresponds to a position of the other display device where the image of the other subject is formed.

According to an eleventh aspect of the present invention, there is provided a recording medium on which is recorded a program which causes a computer to execute a process for controlling a display device, which is constituted by pixels each switchable between an image display operation and an image capture operation according to an applied voltage and has a lens array provided on a surface of the display device. The program includes: a reception step of receiving data of an image of another subject transmitted from an other information processing apparatus which controls an other display device having the same construction as the display device; and a display control step of displaying, on the basis of the data of the image of the other subject received by the processing of the reception step, the image of the other subject in a display area which is made of a plurality of pixels performing the image display operation and is formed at a position of the display device which corresponds to a position of the other display device where the image of the other subject is formed.

According to a twelfth aspect of the present invention, there is provided a program which causes a computer to execute a process for controlling a display device, which has pixels each switchable between an image display operation and an image capture operation according to an applied voltage and has a lens array provided on a surface of the display device. The program includes: a reception step of receiving data of an image of an other subject transmitted from an other information processing apparatus which controls an other display device having the same construction as the display device; and a display control step of displaying, on the basis of the data of the image of the other subject received by the processing of the reception step, the image of the other subject in a display area which is made of a plurality of pixels performing the image display operation and is formed at a position of the display device which corresponds to a position of the other display device where the image of the other subject is formed.

According to a thirteenth aspect of the present invention, there is provides a display device, which is constituted by pixels each switchable between an image display operation and an image capture operation according to an applied voltage and has a lens array provided on a surface of the display device. The display device outputs to an information processing apparatus a signal indicative of an image of a subject formed in an image capture are a made of a plurality of pixels performing the image capture operation, and displays a predetermined image in a display area made of a plurality of pixels performing the image display operation, in accordance with control performed by the information processing apparatus.

In the information processing apparatus and method, the recording medium and the program according to the first to fourth aspects of the present invention, an image of a subject formed in an image capture area made of a plurality of pixels performing an image capture operation is acquired on the basis of outputs from the pixels constituting the image capture area, and data of the acquired image of the subject are transmitted to an other information processing apparatus which controls an other display device having the same construction as the display device. In addition, data of an image of an other subject transmitted from the other information processing apparatus is received, and on the basis of the received data of the image of the other subject, the image of the other subject displayed in a display area which is made of a plurality of pixels performing an image display operation and is formed at a position of the display device which corresponds to a position of the other display device where the image of the other subject is formed.

In the information processing apparatus and method, the recording medium and the program according to the fifth to eighth aspects of the present invention, an image of a subject formed in an image capture area made of a plurality of pixels performing an image capture operation is acquired on the basis of outputs from the pixels constituting the image capture area, and data of the acquired image of the subject are transmitted to an other information processing apparatus which controls an other display device having the same construction as the display device.

In the information processing apparatus and method, the recording medium and the program according to the ninth to twelfth aspects of the present invention, data of an image of an other subject transmitted from an other information processing apparatus which controls an other display device having the same construction as a display device is received, and on the basis of the received data of the image of the other subject, the image of the other subject is displayed in a display area which is made of a plurality of pixels performing an image display operation and is formed at a position of the display device which corresponds to a position of the other display device where the image of the other subject is formed.

In the display device according to the thirteenth aspect of the present invention, a signal indicative of an image of a subject formed in an image capture area made of a plurality of pixels performing an image capture operation is outputted to an information processing apparatus, and a predetermined image is displayed in a display area made of a plurality of pixels performing an image display operation, in accordance with control performed by the information processing apparatus.

According to the present invention, stereoscopic images can be generated.

In addition, according to the present invention, communication parties can communicate with each other in a more natural way.

Furthermore, according to the present invention, it is possible to realize reductions in size of devices for performing communication.

BRIEF DESCRIPTION OF THE DRAWINGS

FIG. 19 is a flowchart illustrating an image processing of an information processing apparatus;

FIG. 20 is a flowchart illustrating a displaying processing of an information processing apparatus;

FIG. 21 is a view showing a construction example of a communication system to which the present invention is applied;

FIG. 25 is a view showing a stereoscopic image reproduced by the monocular image of FIG. 22 being displayed;

DESCRIPTION OF THE PREFERRED EMBODIMENT

Figure 13:
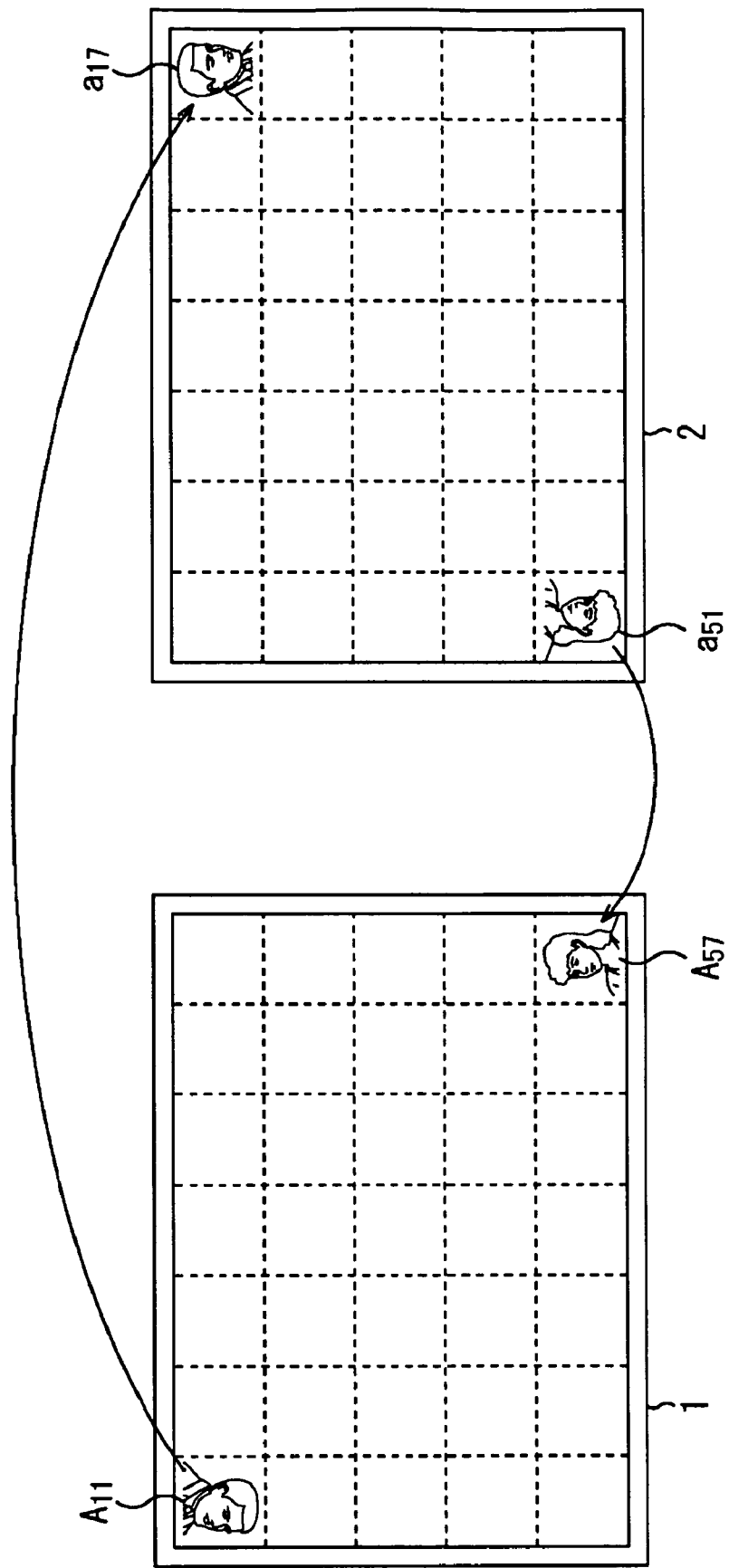
FIG. 13 is a view showing image capture positions and display positions of monocular images.

An information processing apparatus according to an embodiment of the present invention is an information processing apparatus (for example, an information processing apparatus 31 of FIG. 17) for controlling a display device (for example, an I/O display 1 of FIG. 1), which is constituted by pixels each switchable between an image display operation (for example, an operation of FIG. 5) and an image capture operation (for example, an operation of FIG. 6) according to an applied voltage and has a lens array provided on a surface of the display device. The information processing apparatus includes: acquisition means (for example, an monocular image generation section 62 of FIG. 18) for acquiring an image of a subject (for example, a user #1 of FIG. 1) formed in an image capture area made of a plurality of pixels performing the image capture operation, on the basis of outputs from the pixels constituting the image capture area; transmission means (for example, a transmission/reception control section 66 of FIG. 18 which executes the processing of step S6 of FIG. 19) for transmitting data of the image of the subject acquired by the acquisition means to another information processing apparatus controlling an other display device (for example, an I/O display 2 of FIG. 1) having the same construction as the display device; reception means (for example, the transmission/reception control section 66 of FIG. 18 which executes the processing of step S11 of FIG. 20) for receiving data of an image of an other subject (for example, a user #2 of FIG. 1) transmitted from the other information processing apparatus; and display control means (for example, a display control section 68 of FIG. 18) for displaying, on the basis of the data of the image of the other subject received by the reception means, the image of the other subject in a display area which is made of a plurality of pixels performing the image display operation and is formed at a position of the display device which corresponds to a position of the other display device where the image of the other subject is formed (for example, as shown in FIG. 13, displaying an image of the user #2 acquired by an area $a_{51}$ of an I/O display 2 in an area $A_{57}$ of the I/O display 1).

Figure 16:
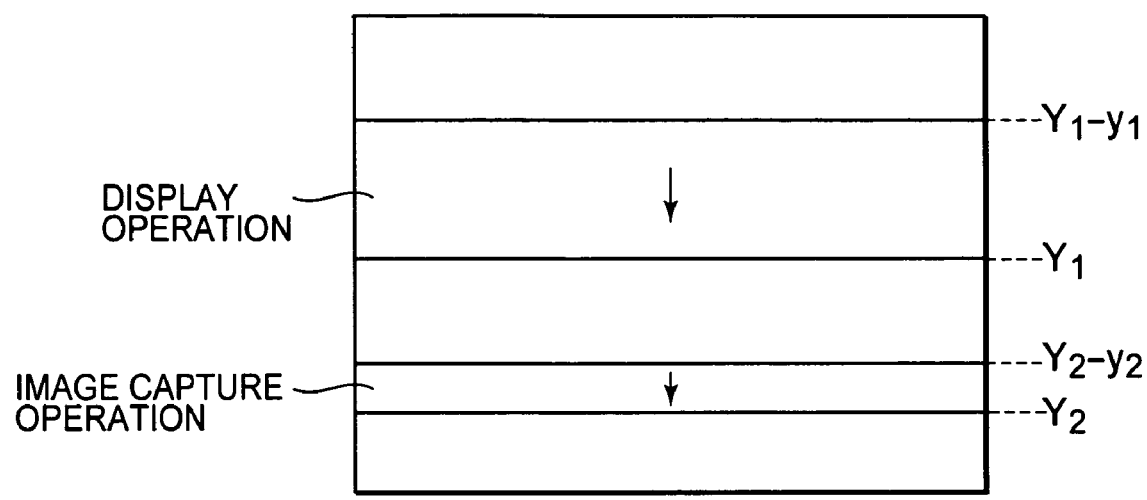
FIG. 16 is a view showing a movement example of the position of an image capture area and a display area.

In an information processing apparatus according to an embodiment of the present invention, the image capture area and the display area is formed at different positions of the display device so that the position of each of the image capture area and the display area is moved sequentially (for example, downwardly as shown in FIG. 16).

An information processing apparatus according to an embodiment of the present invention (an information processing apparatus which is located on a transmission side where image processing is to be performed) further includes conversion means (for example, an inversion processing section 111 of FIG. 34) for converting the image of the subject acquired by the acquisition means into an erected image. The transmission means transmits data of the erected image of the subject converted by the conversion means to the other information processing apparatus.

Figure 34:
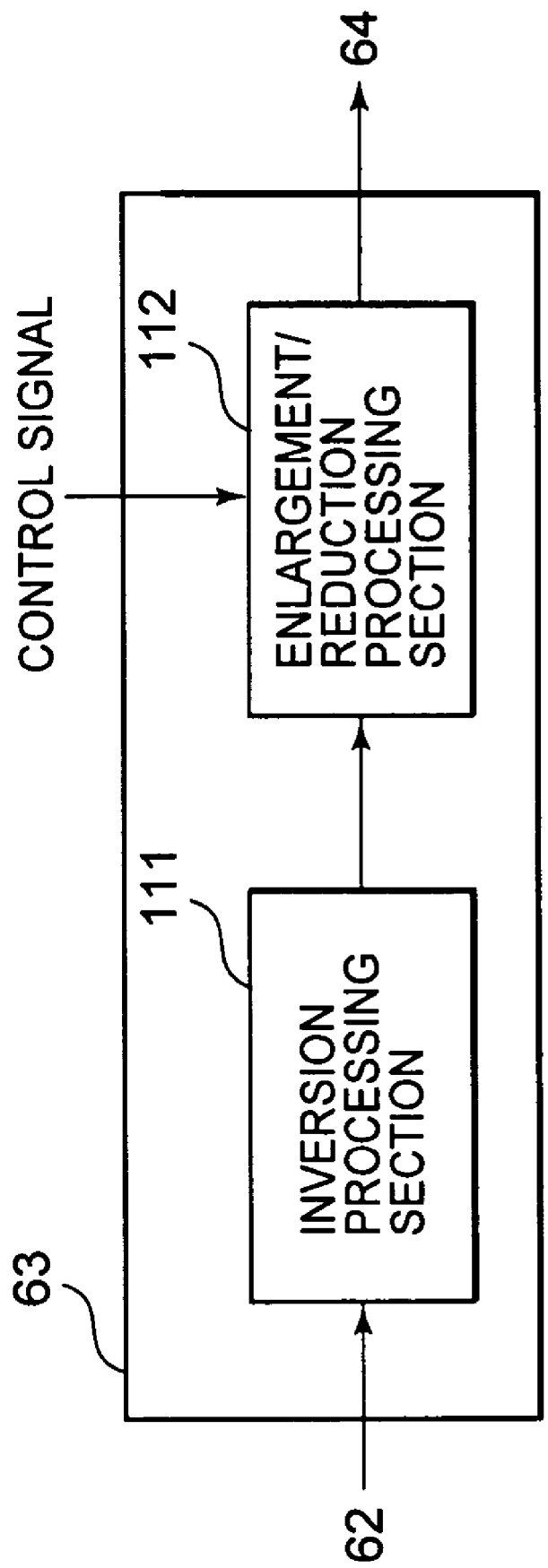
FIG. 34 is a block diagram showing a construction example of an image processing section of FIG. 18.

An information processing apparatus according to an embodiment of the present invention further includes enlargement/reduction processing means (for example, an enlargement/reduction processing section 112 of FIG. 34) for enlarging or reducing the image of the subject converted into the erected image.

An information processing apparatus according an embodiment of the present invention (an information processing apparatus which is located on a reception side where image processing is to be performed) further includes conversion means (for example, the inversion processing section 111 of FIG. 34 included in an image processing section 63 of FIG. 36) for converting the image of the other subject whose data is received by the reception means into an erected image. The display control means displays the erected image of the other subject converted by the conversion means in the display area.

Figure 36:
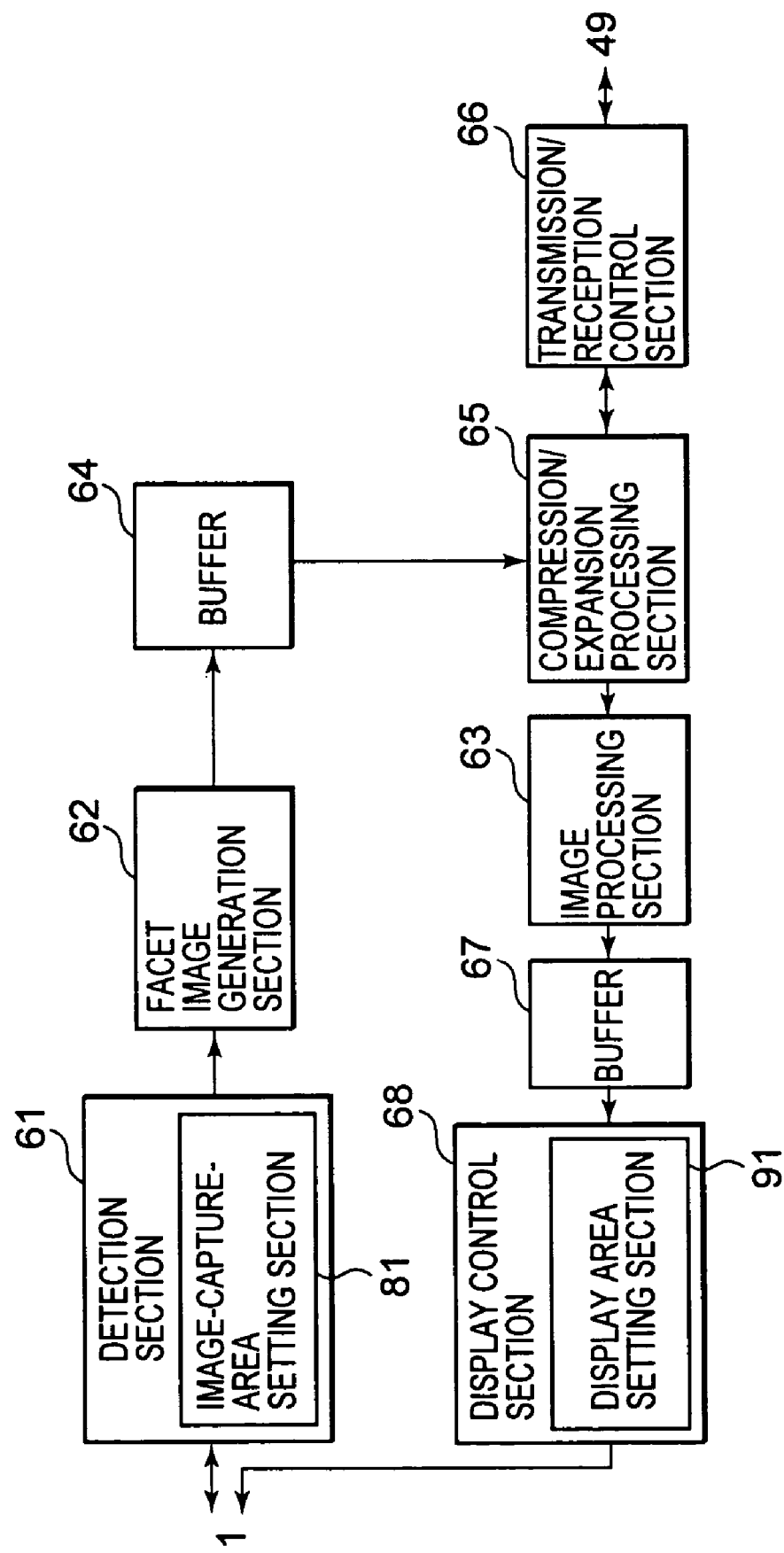
FIG. 36 is a block diagram showing another function construction example of an information processing apparatus.

An information processing apparatus according to an embodiment of the present invention further includes enlargement/reduction processing means (for example, the enlargement/reduction processing section 112 of FIG. 34 included in the image processing section 63 of FIG. 36) for enlarging or reducing the image of the subject which is converted into the erected image by the conversion means.

Figure 18:
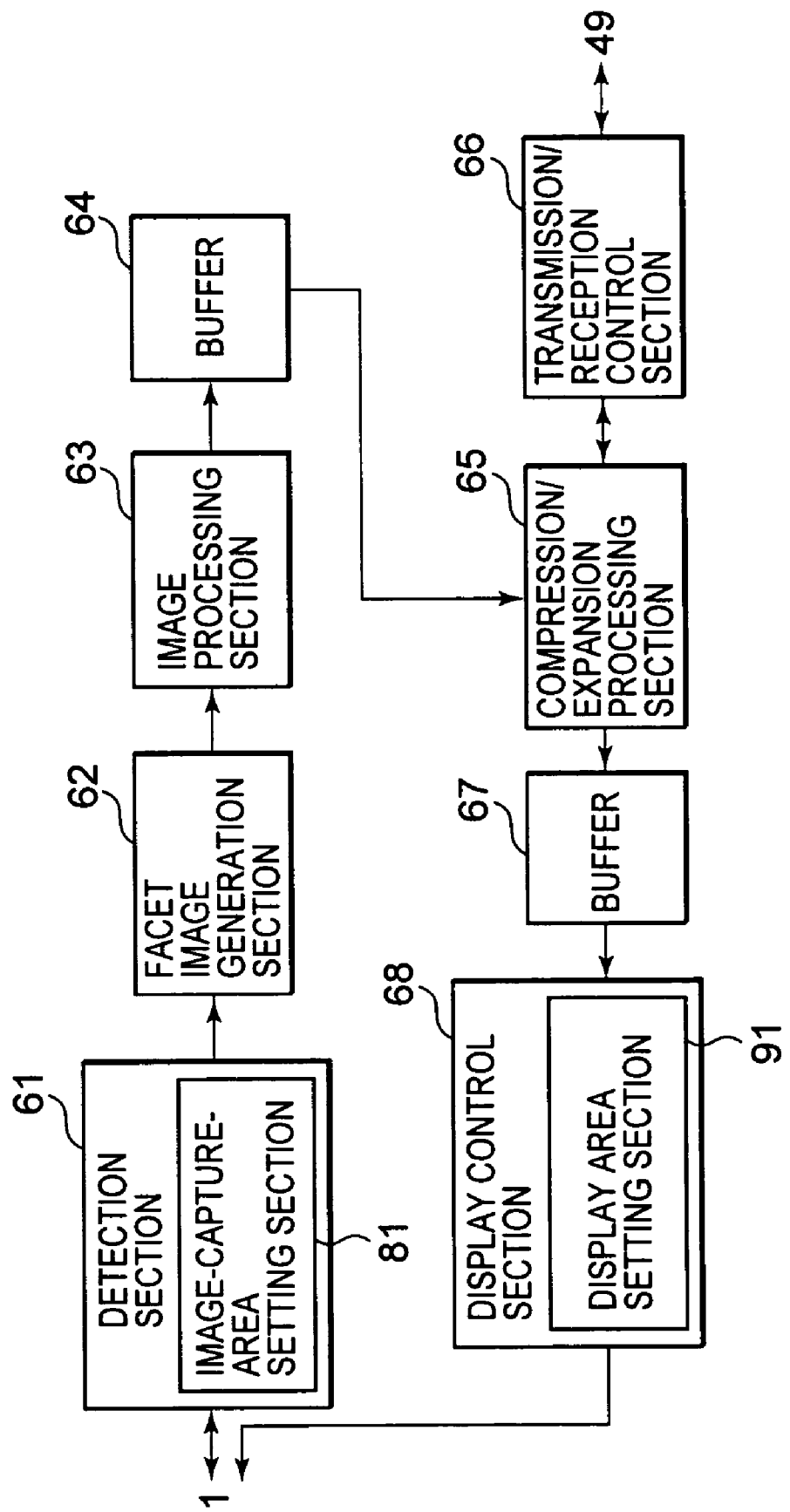
FIG. 18 is a block diagram showing a function construction example of an information processing apparatus.

An information processing apparatus according to an embodiment of the present invention further includes compression means (for example, an compression/expansion processing section 65 of FIG. 18 which executes the processing of step S5 of FIG. 19) for compressing data of a first image of the subject acquired by the acquisition means, by using a difference between the first image of the subject and a second image of the subject which serves as a reference. The transmission means transmits the data of the first image of the subject compressed by the compression means to the other information processing apparatus together with data of the second image of the subject.

An information processing apparatus according to an embodiment of the present invention further includes generation means (for example, the compression/expansion processing section 65 of FIG. 18 which executes the processing of step S12 of 20) for generating data of a second image of the other subject on the basis of data of a first image of the other subject and a difference between the first and second images of the other subject when the reception means receives the data of the first image of the other subject which serves as a reference, and the data of the second image of the other subject represented by a difference from the first image of the other subject.

An information processing method of an information processing apparatus (for example, the information processing apparatus 31 of FIG. 17) for controlling a display device (for example, the I/O display 1 of FIG. 1), which has pixels each switchable between an image display operation and an image capture operation according to an applied voltage and has a lens array provided on a surface of the display device, according to an embodiment of the present invention includes: an acquisition step (for example, step S3 of FIG. 19) of acquiring an image of a subject (for example, the user #1 of FIG. 1) formed in an image capture area made of a plurality of pixels performing the image capture operation, on the basis of outputs from the pixels constituting the image capture area; a transmission step (for example, step S6 of FIG. 19) of transmitting data of the image of the subject acquired by the processing of the acquisition step to an other information processing apparatus controlling an other display device (for example, the I/O display 2 of FIG. 1) having the same construction as the display device; a reception step (for example, step S11 of FIG. 20) of receiving data of an image of an other subject (for example, the user #2 of FIG. 1) transmitted from the other information processing apparatus; and a display control step (for example, step S14 of FIG. 20) of displaying, on the basis of the data of the image of the other subject received by the processing of the reception step, the image of the other subject in a display area which is made of a plurality of pixels performing the image display operation and is formed at a position of the display device which corresponds to a position of the other display device where the image of the other subject is formed (for example, as shown in FIG. 13, displaying an image of the user #2 acquired in the area $a_{51}$ of the I/O display 2 in the area $A_{57}$ of the I/O display 1).

Programs recorded on a recording medium according to embodiments of the present invention, each processing operation (but, one example) corresponding to a respective one of its steps is similar to that of the information processing method according to an embodiment of the present invention.

An information processing apparatus according an embodiment of the present invention is an information processing apparatus (for example, the information processing apparatus 31 of FIG. 17) for controlling a display device (for example, the I/O display 1 of FIG. 1), which has pixels each switchable between an image display operation and an image capture operation according to an applied voltage and has a lens array provided on a surface of the display device. The information processing apparatus includes: acquisition means (for example, the monocular image generation section 62 of FIG. 18) for acquiring an image of a subject (for example, the user #1 of FIG. 1) formed in an image capture area made of a plurality of pixels performing the image capture operation, on the basis of outputs from the pixels constituting the image capture area; and transmission means (for example, the transmission/reception control section 66 of FIG. 18 which executes the processing of step S6 of FIG. 19) for transmitting data of the image of the subject acquired by the acquisition means to another information processing apparatus controlling an other display device (for example, the I/O display 2 of FIG. 1) having the same construction as the display device.

An information processing method according to an embodiment of the present invention is an information processing method of an information processing apparatus (for example, the information processing apparatus 31 of FIG. 17) for controlling a display device (for example, the I/O display 1 of FIG. 1), which has pixels each switchable between an image display operation and an image capture operation according to an applied voltage and has a lens array provided on a surface of the display device. The information processing method includes: an acquisition step (for example, step S3 of FIG. 19) of acquiring an image of a subject (for example, the user #1 of FIG. 1) formed in an image capture area made of a plurality of pixels performing the image capture operation, on the basis of outputs from the pixels constituting the image capture area; and a transmission step (for example, step S6 of FIG. 19) of transmitting data of the image of the subject acquired by the processing of the acquisition step to an other information processing apparatus controlling another display device (for example, the I/O display 2 of FIG. 1) having the same construction as the display device.

Programs recorded on a recording medium according to embodiments of the present invention, each processing operation (but, one example) corresponding to a respective one of its steps is similar to that of the information processing method according an embodiment of the present invention.

An information processing apparatus according to an embodiment of the present invention is an information processing apparatus (for example, the information processing apparatus 31 of FIG. 17) controlling for a display device (for example, the I/O display 1 of FIG. 1), which has pixels each switchable between an image display operation and an image capture operation according to an applied voltage and has a lens array provided on a surface of the display device. The information processing apparatus includes: reception means (for example, the transmission/reception control section 66 of FIG. 18 which executes step S11 of FIG. 20) for receiving data of an image of an other subject (for example, the user #2 of FIG. 1) transmitted from an other information processing apparatus which controls an other display device (for example, the I/O display 2 of FIG. 1) having the same construction as the display device; and display control means (for example, the display control section 68 of FIG. 18) for displaying, on the basis of the data of the image of the other subject received by the reception means, the image of the other subject in a display area which is made of a plurality of pixels performing the image display operation and is formed at a position of the display device which corresponds to a position of the other display device where the image of the other subject is formed (for example, as shown in FIG. 13, displaying the image of the user #2 acquired by the area $a_{51}$ of the I/O display 2 in the area $A_{57}$ of the I/O display 1).

An information processing method according to an embodiment of the present invention is an information processing method for an information processing apparatus (for example, the information processing apparatus 31 of FIG. 17) for controlling a display device (for example, the I/O display 1 of FIG. 1), which has pixels each switchable between an image display operation and an image capture operation according to an applied voltage and has a lens array provided on a surface of the display device. The information processing method includes: a reception step (for example, step S11 of FIG. 20) of receiving data of an image of another subject (for example, the user #2 of FIG. 1) transmitted from an other information processing apparatus which controls an other display device (for example, the I/O display 2 of FIG. 1) having the same construction as the display device; and a display control step (for example, the display control section 68 of FIG. 18) of displaying, on the basis of the data of the image of the other subject received by the processing of the reception step, the image of the other subject in a display area which is made of a plurality of pixels performing the image display operation and is formed at a position of the display device which corresponds to a position of the other display device where the image of the other subject is formed (for example, as shown in FIG. 13, displaying an image of the user #2 acquired by the area $a_{51}$ of the I/O display 2 in the area $A_{57}$ of the I/O display 1).

Programs recorded on a recording medium according to embodiments of the present invention, each processing operation (but, one example) corresponding to a respective one of its steps is similar to that of the information processing method according to an embodiment of the present invention.

A display device according to an embodiment of the present invention is a display device (for example, the I/O display 1 of FIG. 1) which has pixels each switchable between an image display operation and an image capture operation according to an applied voltage and has a lens array provided on a surface of the display device. The display device outputs to an information processing apparatus (for example, the information processing apparatus 31 of FIG. 17) a signal indicative of an image of a subject formed in an image capture area made of a plurality of pixels performing the image capture operation, and displays a predetermined image in a display area made of a plurality of pixels performing the image display operation, in accordance with control performed by the information processing apparatus.

The embodiments of the present invention will be described below with reference to the accompanying drawings.

Figure 1:
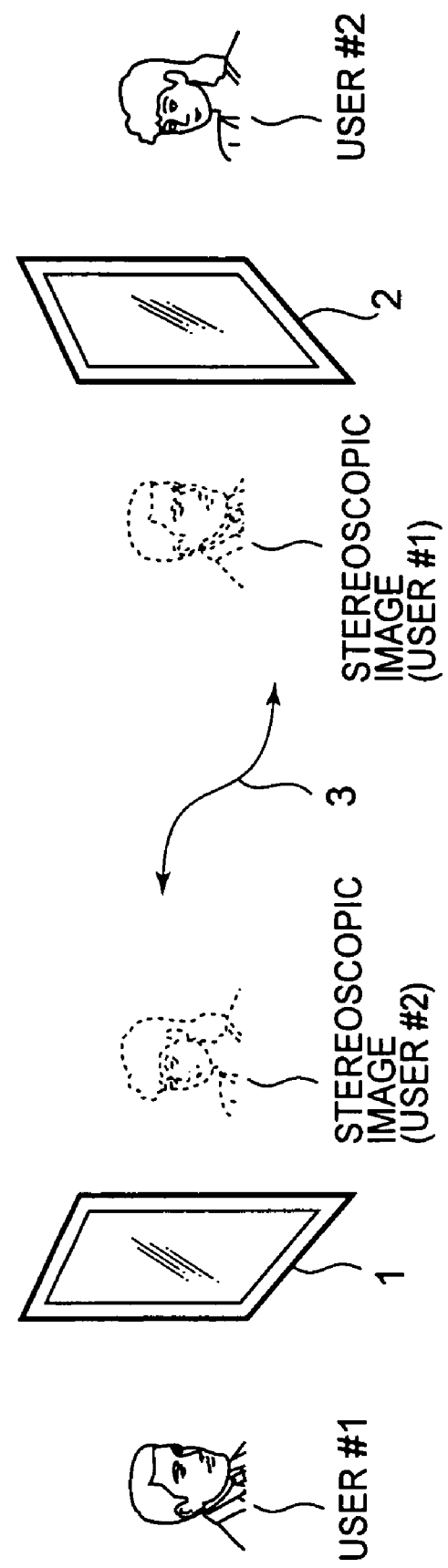
FIG. 1 is a view showing a construction example of an IP stereoscopic image system to which the embodiment of the present invention is applied.

FIG. 1 is a view showing a construction example of an IP stereoscopic image system to which the embodiment of the present invention is applied.

The IP stereoscopic image system includes, for example, I/O (IN/OUT) displays 1 and 2 and a communication channel 3 which connects the I/O display 1 and I/O display 2.

The I/O display 1 is, for example, a display capable of capturing an image of a user #1 who is using the I/O display 1 (an IN function (an image capture function)), and capable of presenting a user #2 who is using the I/O display 2 to the user #1 who is an observer, in the form of a stereoscopic image (a three-dimensional image) viewable from each viewpoint in a real world, on the basis of information transmitted from the I/O display 2 via the communication channel 3.

The stereoscopic image of the user #2 is reproduced at a position where the user #1 can view the stereoscopic image through the I/O display 1.

Similarly, the I/O display 2 is a display capable of capturing an image of the user #2 who is using the I/O display 2, and capable of presenting a stereoscopic image of the user #1 who is using the I/O display 1 to the user #2, on the basis of information transmitted from the I/O display 1 via the communication channel 3. The stereoscopic image of the user #1 is also reproduced at a position where the user #2 can view the stereoscopic image through the I/O display 2.

As will be described later, image capture of a subject (either one of the users #1 or #2) is performed by the use of pixels which constitute the display surface of the corresponding one of the I/O displays 1 and 2. Presentation of a stereoscopic image of each of the users #1 and #2 is also performed by the use of the pixels which constitute the display surface of the corresponding one of the I/O displays 1 and 2.

Accordingly, data of the image of the subject captured by each of the I/O displays 1 and 2 which are communicating with each other is transmitted to the other and the I/O displays 1 and 2 reproduce their respective received data in real time, whereby the I/O displays 1 and 2 can perform communication with each other in real time.

In addition, a construction which performs image capture of a subject and a construction which reproduces an image of a communication party are realized by the same construction, whereby, for example, the user #1 can cause the I/O display 1 to capture an image of himself or herself, while viewing the eyes of the user #2 (stereoscopic image) reproduced by the I/O display 1.

In this case, since the image of the user #1 who is viewing the eyes of the user #2 is reproduced on the I/O display 2, the user #2 can perform communication with the user #1 while viewing the eyes of the user #1 (stereoscopic image) reproduced by the I/O display 2. An image of the user #2 viewing the eyes of the user #1 is also captured by the I/O display 2 and is presented in real time by the I/O display 1 as a stereoscopic image of the user #2.

In other words, it is possible to realize communication with eye-to-eye contact between remote locations, which communication is unrealizable if a construction which performs image capture and a construction which performs display are prepared as separate pieces of hardware like a digital camera and a display.

In addition, since each of the I/O displays 1 and 2 can be realized as an integrated apparatus, each of the I/O displays 1 and 2 can be reduced in size and cost compared to the case where the construction which performs image capture and the construction which performs display are prepared as separate pieces of hardware.

The communication channel 3 is, for example, a network including the Internet and the like, and may be either wired or wireless. In addition, the voice of each of the users #1 and #2 which is picked up by the corresponding one of microphones which are not shown is also transmitted to the I/O display 1 or 2 of the other.

The IN function (image capture function) will be described below. The following description focuses on the function (construction) of the I/O display 1, but the I/O display 2 also has the same function (construction).

Figure 2:
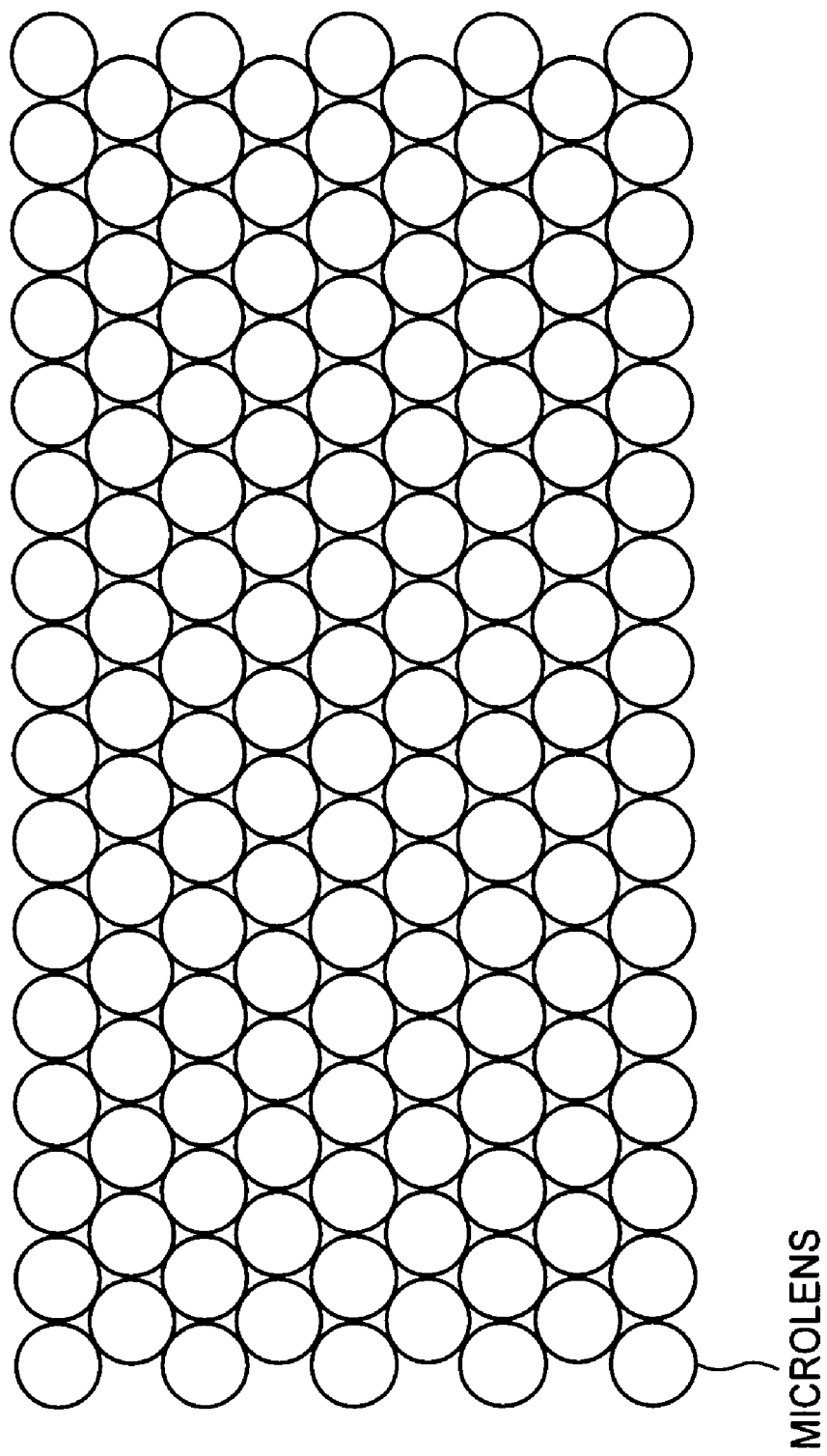
FIG. 2 is a plane view of an I/O display of FIG. 1.
Figure 3:
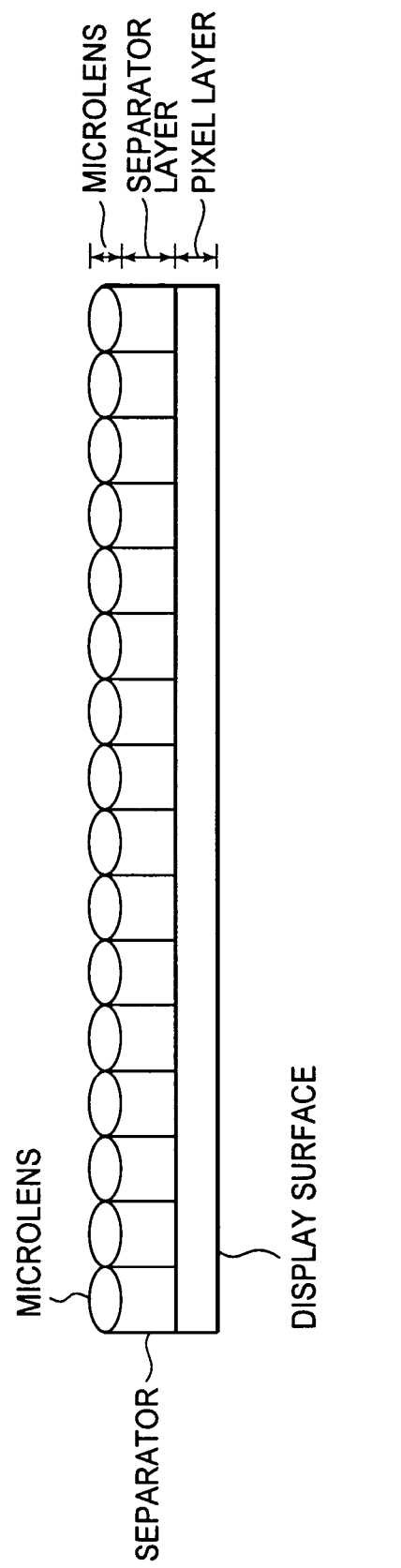
FIG. 3 is a cross-sectional view of the I/O display of FIG. 1.

The surface of the I/O display 1 which is opposed to the subject (for example, the user 1) is provided with a lens array including a multiplicity of microlenses arranged in a planar form as shown in the plan view of FIG. 2 and in the cross-sectional view of FIG. 3.

As shown in the cross-sectional view of FIG. 3, a layer of separators is disposed between a layer of pixels on which an image of the subject is to be formed, and a layer of microlenses so that light rays collected by each of the microlenses and those collected by the adjacent one are prevented from interfering with each other.

As will be described later, in the I/O display 1, for example, a pixel which performs an image capture operation and a pixel which performs a display operation may be located adjacently to each other. However, since the separator layer is disposed, light exiting from one pixel which is performing a display operation is prevented from entering another pixel which is performing an image capture operation.

Because of the above-mentioned construction, in the I/O display 1, images of the subject are obtained which are respectively viewed through the multiplicity of microlenses, i.e., monocular images.

Figure 4:
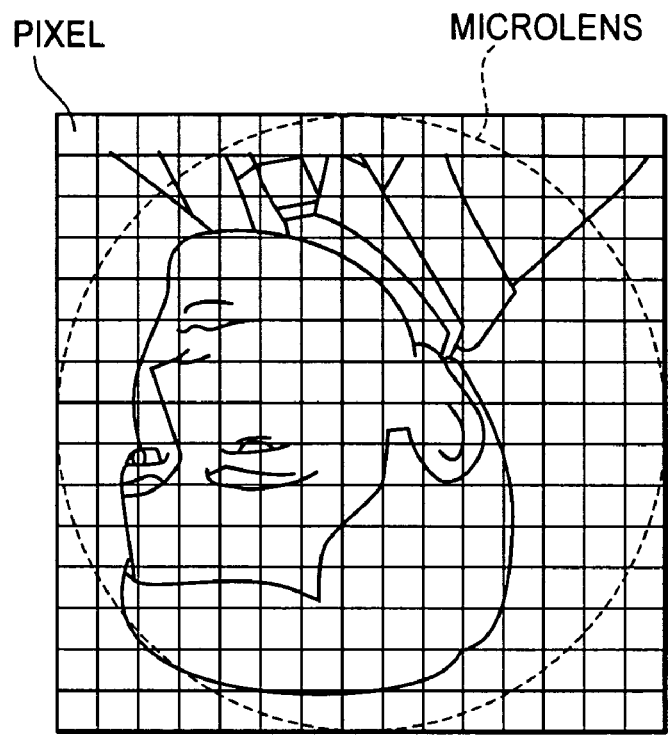
FIG. 4 is a plan view showing one area surrounded by separators of FIG. 3.

FIG. 4 is a plan view showing an example of one area made of pixels surrounded by one of the separators shown in FIG. 3.

This one area is made of, for example, 15×15 pixels {each having a set of three RGB subpixels (a total of 15×3×15 subpixels)}. In this manner, one microlens is disposed in front of (on the subject side of) one area made of, for example, 15×15 pixels, whereby an image of the subject which is rotated by 180 degrees about the optical axis is formed on the area of 15×15 pixels as shown in FIG. 4.

An area which is performing an image capture operation and is made of a predetermined number of pixels on which one image of the subject is formed is hereinafter referred to also as the image capture area. An area which is performing an display operation and is made of a predetermined number of pixels which display one image of the subject is hereinafter referred to also as the display area.

Although FIG. 4 shows an example in which one monocular image is captured by means of 15×15 pixels, the number of pixels is not limitative and, as a matter of course, image capture may also be performed with a larger number of pixels. As the number of pixels to be assigned to one microlens is made larger, a subject image of higher resolution can be obtained.

As mentioned above, in the I/O display 1, not only a display operation but also an image capture operation, i.e., detection of light rays collected by each of the microlenses, is performed by a respective one of the pixels.

Figure 5:
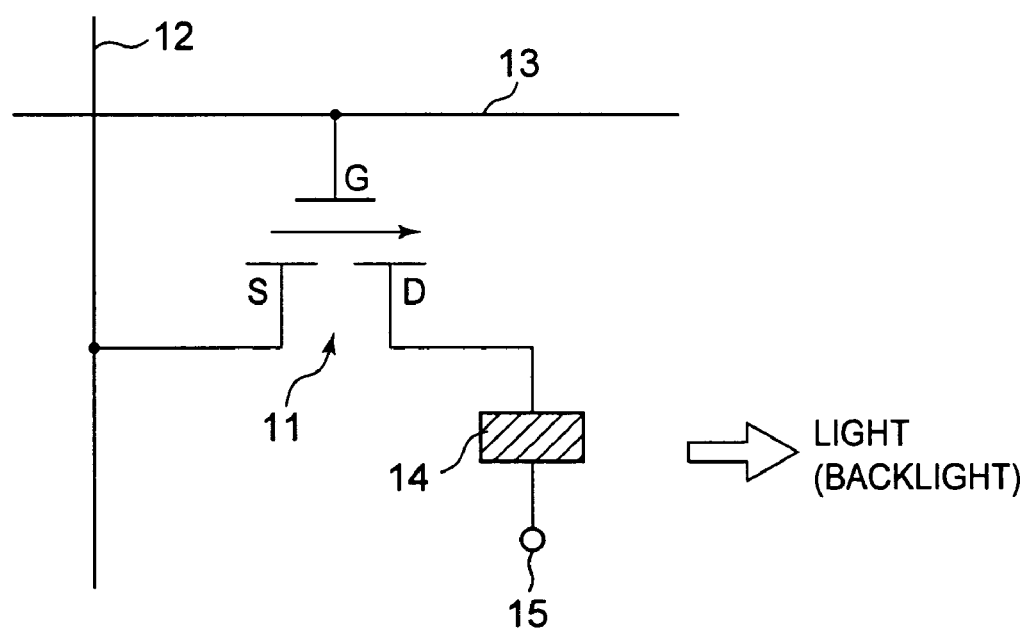
FIG. 5 is a view showing a circuit construction example of one pixel constituting an I/O display.
Figure 6:
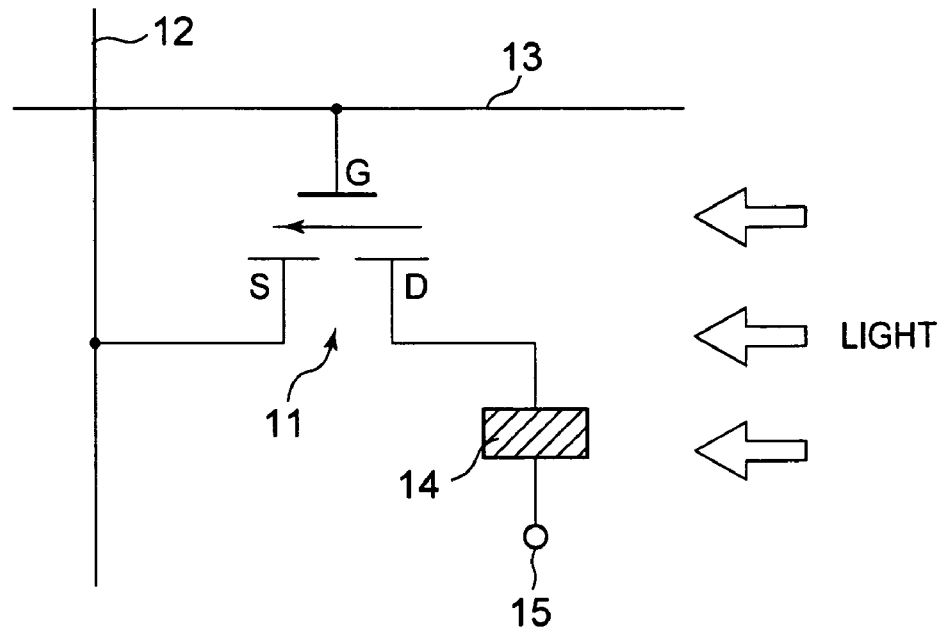
FIG. 6 is a view showing a circuit construction example of one pixel constituting an I/O display.

FIGS. 5 and 6 are diagrams showing an example of the circuit construction of one pixel which constitutes the I/O display 1.

For example, each of the pixels includes a TFT (Thin Film Transistor) 11 and a liquid crystal 14. Namely, the I/O display 1 made of the pixels constructed as shown in FIGS. 5 and 6 is a TFT liquid crystal display (LCD).

When a forward voltage (bias voltage) is applied to a gate electrode G of gate line 13 of the TFT 11, a current flows from a source electrode S of a sores line 12 to a drain electrode D in an active semiconductor layer (channel) made of amorphous silicone or polysilicon according to a voltage applied to the source electrode S, as shown by a solid line arrow in FIG. 5.

One of the electrodes of the liquid crystal 14 is connected to the drain electrode D of the TFT 11, and the molecular arrangement of the liquid crystal 14 varies according to the potential difference between the electrodes of the liquid crystal 14 (between the electrode to which the drain electrode D is connected and a counter electrode 15) which is caused by the current flowing in the channel of the TFT 11, whereby light from a backlight is made to exit to the outside of the pixel of FIG. 5.

The light from the backlight is made to exit to the outside of the I/O display 1 via the separator layer and the microlens layer shown in FIG. 3, whereby an image is displayed.

On the other hand, when a voltage near 0 V or a reverse voltage is applied to the gate electrode G of the TFT 11, no current flows in the channel even when a voltage is being applied to the source electrode S.

During this state, when external light collected by the corresponding of the microlenses irradiates the TFT 11 as shown by outline arrows in FIG. 6, a slight amount of leak current (off current) flowing from the drain electrode D to the source electrode S is produced by the photoconductivity of the channel of the TFT 11.

From this fact, by amplifying a leak current produced by a pixel (the TFT 11) to which a voltage near 0 V or a reverse voltage is applied, and detecting the presence or absence of the leak current, it is possible to discriminate whether or not external light is irradiated onto the pixel. In addition, the amount of light can also be discriminated on the basis of the amount of the leak current.

Since RGB lights are discriminated by the respective RGB subpixels, a color monocular image of the subject (the user #1) is obtained by synthesizing the outputs from all the pixels that constitute the image capture area shown in FIG. 4.

From the above-mentioned fact, it can be seen that one pixel (the TFT 11) can be made to selectively perform a display operation and an image capture operation, by controlling voltages to be applied to the pixel.

For the convenience of description, FIG. 5 shows that light exits from the liquid crystal 14 to the right direction as shown by an outline arrow. Actually, the electrodes of the liquid crystal 14 are made of transparent electrodes, and light from the backlight is made to exit to the outside through the transparent electrodes.

Figure 7:
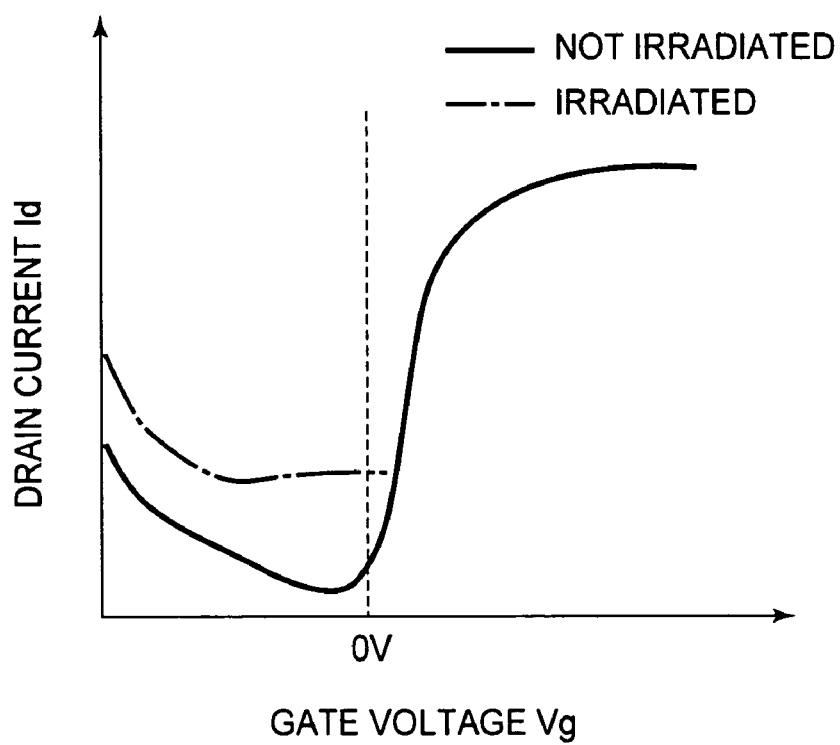
FIG. 7 is a graph showing a measured example of the values of a drain current of a TFT.

FIG. 7 is a graph showing a measured example of the values of the drain current Id of the TFT 11 which is irradiated with light and a measured example of the values of the drain current Id of the TFT 11 which is not irradiated with light. In FIG. 7, the vertical axis represents the drain current Id, while the horizontal axis represents the gate voltage Vg.

As shown in FIG. 7, when a forward gate voltage Vg is being applied, the drain current Id having approximately the same value is detected irrespective of whether light is irradiated or not.

On the other hand, if light is irradiated when a voltage near 0 V or a reverse voltage is being applied, the drain current Id having a large value is detected compared to the case where light is not irradiated.

Accordingly, detection of the presence or absence of external light becomes possible from the fact that current values detected on the basis of the presence or absence of light differ between when a forward voltage is being applied and when a voltage near 0 V or a reverse voltage is being applied.

Incidentally, the reason why when a forward voltage is being applied, a difference does not occur between current values detected on the basis of the presence or absence of light is that a current flowing when the forward voltage is applied is much larger than a current flowing (produced) when light is irradiated.

Figure 8:
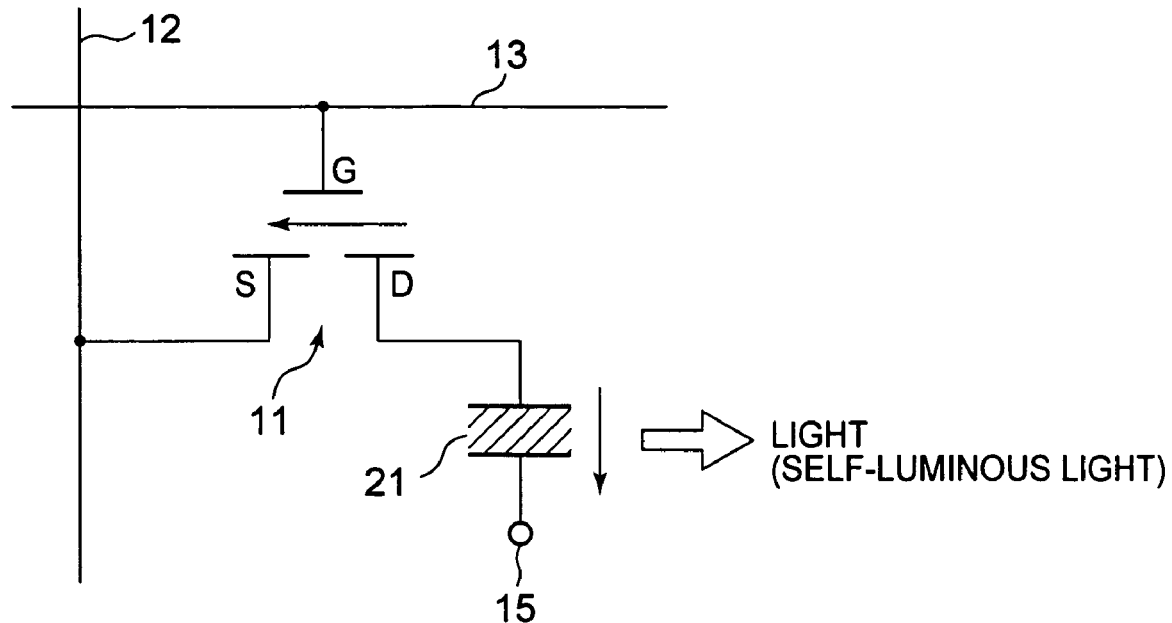
FIG. 8 is a view showing another circuit construction example of one pixel constituting an I/O display.
Figure 9:
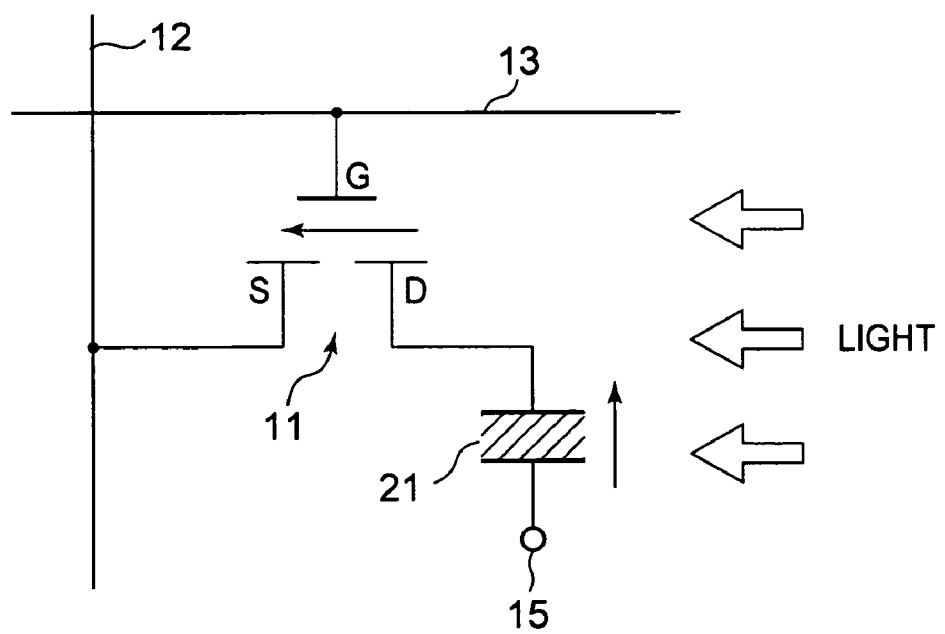
FIG. 9 is a view showing another circuit construction example of one pixel constituting an I/O display.

FIGS. 8 and 9 are views showing another example of the circuit construction of one pixel which constitutes the I/O display 1. In FIGS. 8 and 9, the same reference numerals are used to denote the same constituent elements as those shown in FIGS. 5 and 6.

In the example shown in FIGS. 8 and 9, each of the pixels includes an EL (Electroluminescence) device 21 in place of the liquid crystal 14 shown in FIGS. 5 and 6. Namely, the I/O display 1 made of pixels each having the construction shown in FIGS. 8 and 9 is a self-luminous type of EL display.

When a forward voltage is applied to the gate electrode G of the gate line 13 the TFT 11, a current flows from the source electrode S to the drain electrode D in the channel according to a voltage applied to the source electrode S of the source line 12, as shown by a solid line arrow in FIG. 8.

The anode electrode of the EL device 21 is connected to the drain electrode D of the TFT 11, and the EL device 21 emits light as shown by an outline arrow in FIG. 8 according to the potential difference between the anode electrode and cathode electrode of the EL device 21 which is caused by the current flowing in the channel of the TFT 11.

The light from the EL device 21 is made to exit to the outside of the I/O display 1 via the separator layer and the microlens layer shown in FIG. 3, whereby an image is displayed.

On the other hand, when a voltage near 0 V or a reverse voltage is applied to the gate electrode G of the TFT 11, no current flows in the channel even when a voltage is being applied to the source electrode S, so that a potential difference is not generated between the anode electrode and the cathode electrode of the EL device 21 and the EL device 21 does not emit light.

During this state, when external light collected by the microlens irradiates the pixel of FIG. 9 as shown by outline arrows in FIG. 9, as mentioned above, a slight amount of leak current (off current) flowing from the drain electrode D to the source electrode S is generated by the photoconductivity of the channel of the TFT 11. Similarly, a leak current is generated in the EL device 21 as well.

From this fact, by amplifying a leak current generated by a pixel (the TFT 11 and the EL device 21) to which a voltage near 0 V or a reverse voltage is applied, and detecting the presence or absence of the leak current, it is possible to discriminate whether or not external light is irradiated onto the pixel. In addition, it is also possible to discriminate the amount of light on the basis of the amount of the leak current.

Since the presence or absence of and the amount of each of RGB lights are discriminated by a respective one of RGB pixels (a pixel having the EL device 21 which emits R light, a pixel having the EL device 21 which emits G light, and a pixel having the EL device 21 which emits B light), a color monocular image of the subject is obtained by synthesizing the outputs from all the pixels that constitute the image capture area shown in FIG. 4.

It is to be noted that if external light is irradiated onto the pixel constructed as shown in FIGS. 8 and 9 when, for example, a voltage near 0 V is being applied to the pixel, not only a leak current generated by the TFT 11 but also a leak current generated by the EL device 21 is detected, so that the EL display having the pixels in each of which the TFT 11 is disposed is higher in sensitivity to external light than the TFT liquid crystal display having the pixels each having the construction shown in FIGS. 5 and 6.

Figure 10:
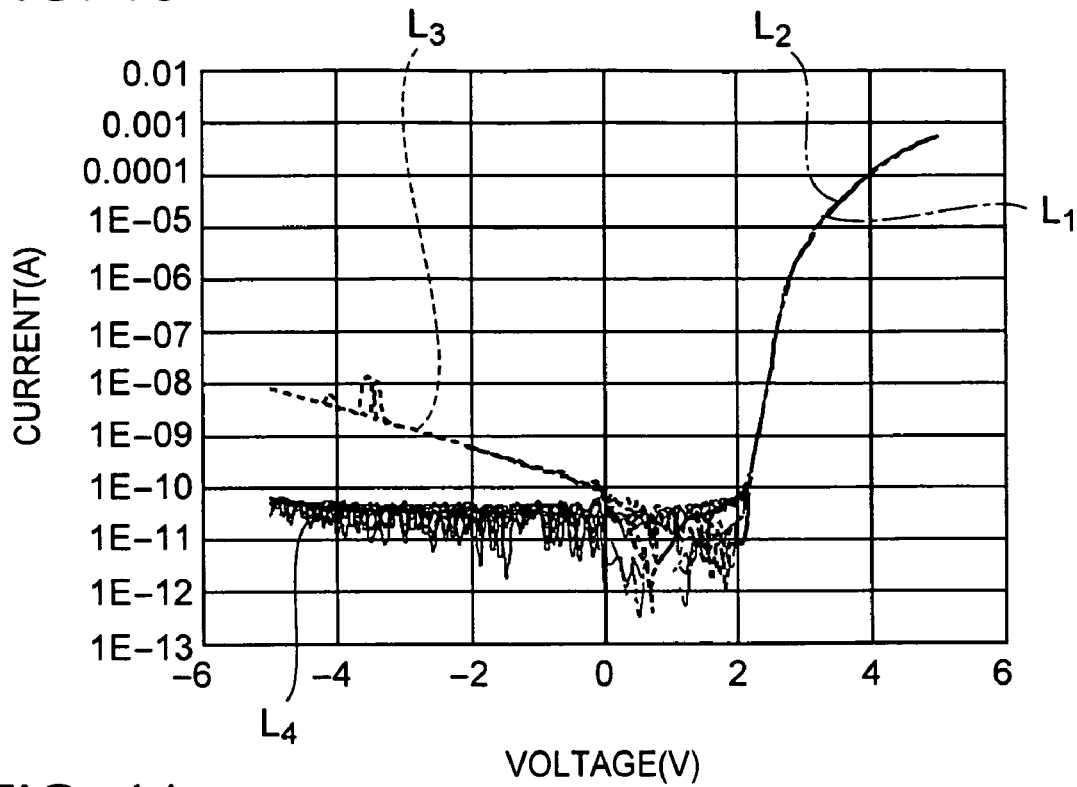
FIG. 10 is a graph showing examples of the measured values of currents detected in the pixel shown in FIGS. 8 and 9.

FIG. 10 is a graph showing examples of the measured values of currents generated in the pixel shown in FIGS. 8 and 9. In FIG. 10, the vertical axis represents the currents in the pixel, while the horizontal axis represents the voltages applied to the gate electrode G.

Among lines representing the measurement result, a line $L_1$ indicates the value of a current detected from the pixel when light is external light is irradiated onto the pixel with a forward voltage applied to the gate electrode G (a current flowing in the channel of the TFT 11 and a current flowing in the EL device 21), while a line $L_2$ indicates the value of a current generated in the pixel when external light is not irradiated onto the pixel with a forward voltage applied to the gate electrode G.

These lines $L_1$ and $L_2$ show that when a forward voltage is being applied, the detected values do not differ, irrespective of the presence or absence of external light.

On the other hand, in FIG. 10, a line $L_3$ indicates the value of a current generated by the pixel when external light is irradiated onto the pixel with a reverse voltage applied to the gate electrode G, while a line $L_4$ indicates the value of a current generated by the pixel when external light is not irradiated onto the pixel with a reverse voltage applied to the gate electrode G.

As can be seen from a comparison of the line $L_3$ and line $L_4$, if a reverse voltage is being applied, the currents generated by the pixel differ between when external light is irradiated and when external light is not irradiated. For example, if a predetermined amount of external light is irradiated when a voltage of approximately −5 V (reverse voltage) is being applied, a current of approximately 1E-8 (A) is generated (a current generated in the active semiconductor layer of the TFT 11 and a current generated by the EL device 21).

In FIG. 10, the line $L_4$ indicates that even when external light is not irradiated, a slight current of approximately 1E-10 (A) is generated, but this slight current is due to noise during measurement. Incidentally, even if the EL device 21 is an EL device which emits any of RGB lights, obtainable measurement results are approximately the same as those shown in FIG. 10.

Figure 11:
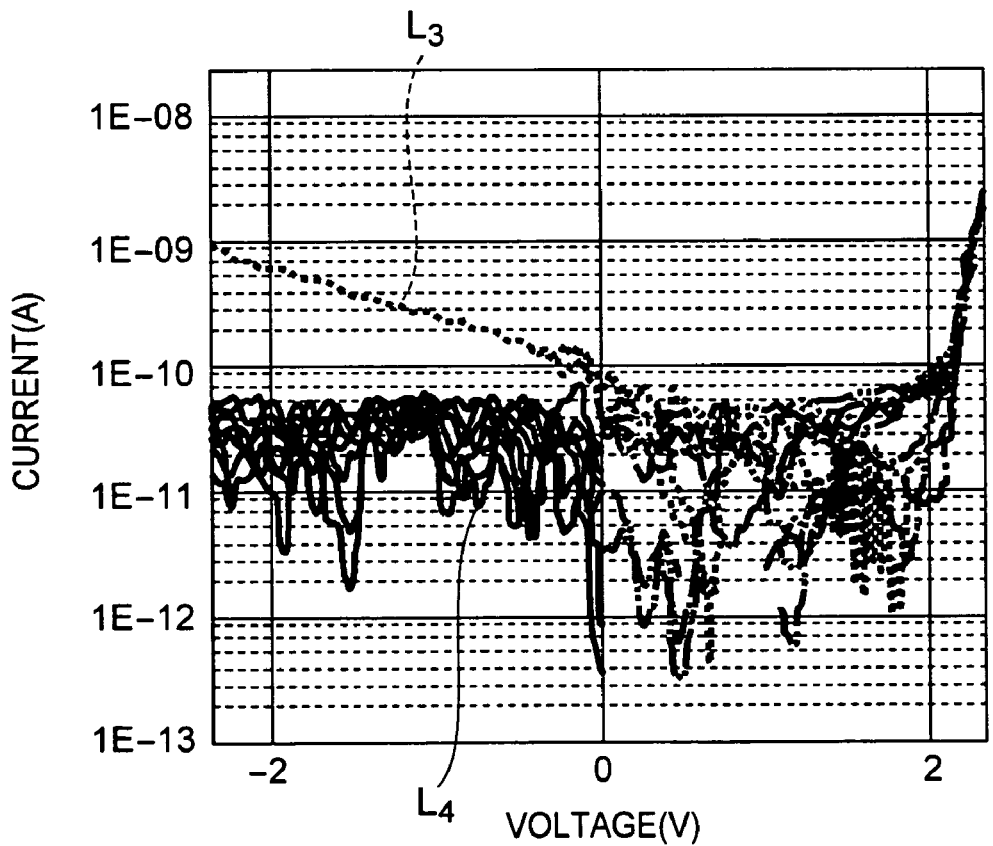
FIG. 11 is an enlarged graph showing a range near 0 V in FIG. 10.

FIG. 11 is an enlarged graph showing a range near 0 V in FIG. 10.

As shown by the line $L_3$ and the line $L_4$ in FIG. 11, even when a voltage near 0 V is being applied to the gate electrode G, a difference in the current value of the pixel is detected between when external light is irradiated and when external light is not irradiated.

Accordingly, even when a voltage near 0 V is being applied, the generated current can be amplified to detect the difference, i.e., whether external light is being irradiated onto the pixel.

From this fact, a particular pixel can be made to perform an image capture operation, by controlling the gate voltage to a value near 0 V without intentionally applying a reverse voltage to the gate electrode G.

By controlling the gate voltage to a value near 0 V and making the pixel to perform an image capture operation, it is possible to reduce the power consumption of the pixel by the amount of the reverse voltage compared to the case where the pixel is made to perform an image capture operation, by applying a reverse voltage to the gate electrode.

In addition, since the number of voltages to be controlled is reduced, easy control of the voltages and a simple system construction can be achieved. Namely, to control the gate voltage to a voltage near 0 V is to perform control so as to prevent a forward voltage from being applied to the gate electrode, so that the I/O display 1 can be realized only with a power source circuit and control lines for controlling gate voltages so as to enable forward voltages to be applied to gate electrodes (there is no need to separately prepare control lines for controlling gate voltages so as to enable reverse voltages to be applied to gate electrodes).

Accordingly, it is possible to simplify the construction of a power source circuit on each of the driver board and the system board of the I/O display 1, whereby it is not only possible to realize reduced power consumption but it is also possible to realize efficient use of limited spaces on those boards.

Furthermore, since no reverse voltage is applied to the gate electrode, it is possible to prevent the breakdown of the TFT 11 or the EL device 21 which may occur when a reverse voltage is applied. For example, the withstand voltage characteristics of the TFT 11 can be improved by increasing the channel length (L length), but in this case, the current of the TFT 11 which is turned on (conducting) decreases, and the channel width (W length) needs be increased in order to ensure a sufficient current.

As a result, if the withstand voltage characteristics are to be improved without varying current values flowing in the TFT 11, the size of the TFT 11 needs to be increased, but it is difficult to incorporate the TFT 11 of increased size into each pixel of a high-definition display pixel made of pixels each having a small size.

Accordingly, if reverse voltage is eliminated, the withstand voltages of the TFT 11 and the EL device 21 become easy to design, and the sizes of the TFT 11 and the EL device 21 themselves can be reduced, whereby a high-definition display can be realized.

As mentioned above, in the case where the TFT 11 is provided in each of pixels which constitute the I/O display 1, the I/O display 1 can perform an image capture operation using the pixels by applying a voltage near 0 V or a reverse voltage to the gate electrodes.

For example, if all pixels of the I/O display 1 are made to perform image capture operations, images of the subject (the user #1) can be obtained by the number of the microlenses (the number of the image capture areas) from viewpoints corresponding to the positions of the respective microlenses.

The OUT function (display function) will be described below.

Figure 12:
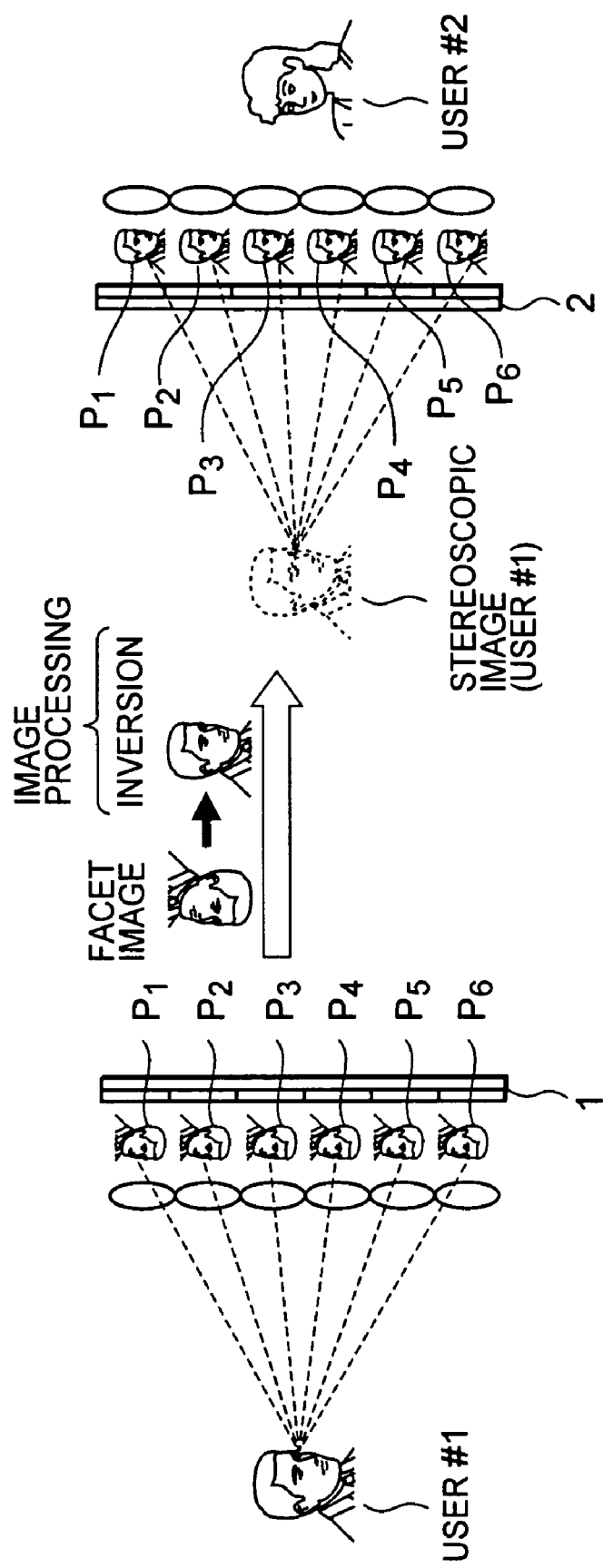
FIG. 12 is a view schematically showing the reproduction of a stereoscopic image.

FIG. 12 is a view schematically showing the reproduction of a stereoscopic image of the user #1.

The left side of FIG. 12 shows the state in which monocular images $P_1$ to $P_6$ of the user #1 are captured by the I/O display 1. The right side of FIG. 12 shows the state in which the monocular images $P_1$ to $P_6$ which are respectively images of the user #1 are displayed by the I/O display 2.

In FIG. 12, the monocular images $P_1$ to $P_6$ are shown as the same image for the convenience of description. Actually, since the capture positions of the respective monocular images $P_1$ to $P_6$ differ with respect to one subject, the monocular images $P_1$ to $P_6$ are slightly different images corresponding to the respective capture positions. In FIG. 12, the separator layer of FIG. 3 is omitted for the sake of simplicity.

The monocular images $P_1$ to $P_6$ formed by the respective microlenses provided in the I/O display 1 and obtained by the I/O display 1 are subjected to predetermined image processing such as inversion processing centered at their respective optical axes by the I/O display 1, and are transmitted from the I/O display 1 to the I/O display 2.

In the I/O display 2, the monocular images $P_1$ to $P_6$ captured by the I/O display 1 are respectively displayed in areas (display areas) located at the corresponding positions. In the example shown in FIG. 12, the monocular images $P_1$ to $P_6$ are respectively displayed in the display areas in ascending order from top to bottom.

FIG. 13 is a view showing an example of the image capture positions of monocular images and an example of the display positions of monocular images.

In FIG. 13, 5×7 areas as shown in FIG. 4 are formed in each of the I/O display 1 and the I/O display 2. Actually, a far greater number of areas are formed by the number of microlenses.

If it is assumed that each area of the I/O display 1 is represented by an area $A_{ij}$ (the area in the i-th row and the j-th column) which starts from the top left area and that each area of the I/O display 2 is represented by an area $a_{ij}$ which starts from the top left area, a monocular image captured in an area $A_{11}$ (image capture area) of the I/O display 1 is displayed in an area $a_{17}$ (display area) of the I/O display 2 which is located at a position corresponding to the position of the area $A_{11}$.

Namely, in order to reproduce the state in which the user #1 and the user #2 oppose each other across the I/O displays, the monocular image obtained by capturing the user #1, who is a subject opposing the I/O display 1, in the area $A_{11}$ of the I/O display 1 is displayed in the top right area $a_{17}$ of the I/O display 2. Accordingly, light rays which travel from the user #1 to the image capture position thereof during image capture can be reproduced as light rays which travel toward the user #2, by the I/O display 2.

Namely, the area $a_{ij}$ of the I/O display 2 located at a position which makes it possible to reproduce light rays captured during image capture is an area corresponding to the area $A_{ij}$ of the I/O display 1.

Similarly, a monocular image captured in an area $A_{12}$ is displayed in an area $a_{16}$, a monocular image captured in an area $A_{13}$ is displayed in an area $a_{15}$, and a monocular image captured in an area $A_{14}$ is displayed in an area $a_{14}$. Monocular images captured in the other areas $A_{ij}$ of the I/O display 1 are respectively displayed in the corresponding areas $a_{kl}$ of the I/O display 2.

A monocular image captured in an area $a_{51}$ (image capture area) of the I/O display 2 is displayed in an area $A_{57}$ of the I/O display 1 which is located at a position corresponding to the position of the area $a_{51}$.

Similarly, a monocular image captured in an area $a_{52}$ is displayed in an area $A_{56}$, a monocular image captured in an area $a_{53}$ is displayed in an area $A_{55}$, and a monocular image captured in an area $a_{54}$ is displayed in an area $A_{54}$. Monocular images captured in the other areas $a_{ij}$ of the I/O display 2 are respectively displayed in the corresponding areas $A_{kl}$ of the I/O display 1.

Accordingly, if it is assumed that, for example, the time taken to communicate images and the time taken by processing such as reproduction of images can be ignored, pixels constituting the respective areas of the I/O display 1 and pixels constituting the corresponding areas of the I/O display 2 perform mutually inverted operations.

Namely, while image capture is being performed in one area of the I/O display 1, image display is being performed in an area of the I/O display 2 which is located at a position corresponding to the area of the I/O display 1. Conversely, while image display is being performed in another area of the I/O display 1, image capture is being performed in an area of the I/O display 2 which is located at a position corresponding to the area of the I/O display 1. Accordingly, image capture of the subjects and reproduction of their stereoscopic images are performed in real time.

Returning to FIG. 12, the user #2 views through the lens array of the I/O display 2a plurality of monocular image which are displayed on the I/O display 2 in the above-mentioned manner. Accordingly, the user #2 can view a stereoscopic image of the subject (the user #1) from his/her viewpoint.

Principles which enable a user to obtain a stereoscopic subject image similar to what the user can see in the real world will be described below.

Figure 14:
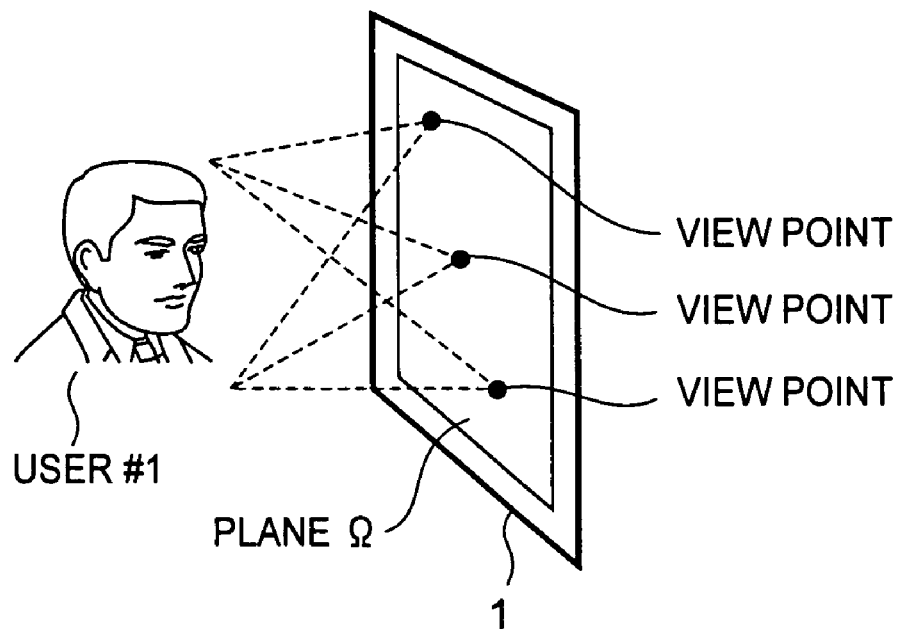
FIG. 14 a view showing principles which make it possible to obtain a stereoscopic image.

As mentioned above, for example, in the I/O display 1, data of monocular images of the user #1 which are respectively captured from a plurality of viewpoints (in individual areas) are acquired. This fact can be regarded as indicating that, as shown in FIG. 14, image data of the subject is acquired whose image is captured by using a plurality of points on a plane $\Omega$ of the surface of the I/O display 1 as viewpoints.

Figure 15:
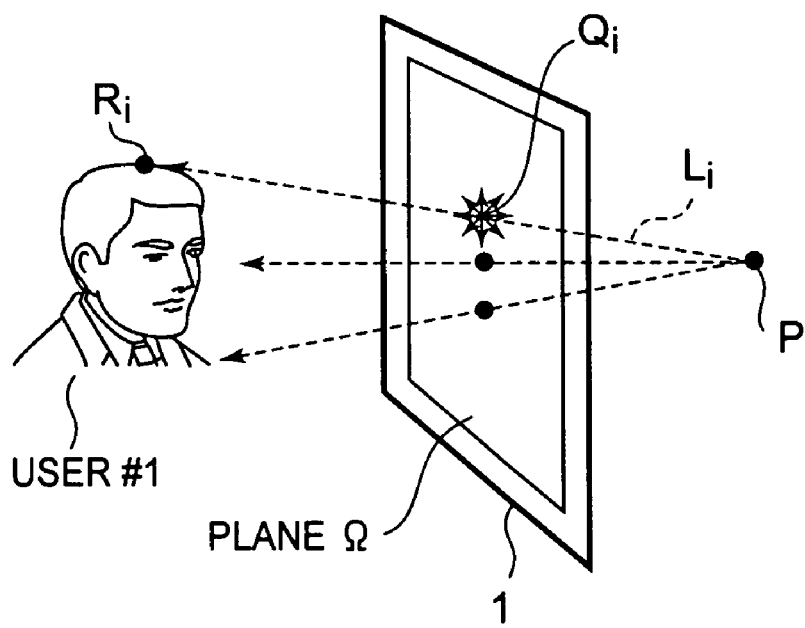
FIG. 15 is another view showing principles which make it possible to obtain a stereoscopic image.

Consideration will be given here to an image which is seen by vision when the subject is viewed from a viewpoint P which is set at a particular position on the side of the plane $\Omega$ opposite to the subject as shown in FIG. 15.

In addition, the viewpoint P is set at a position which causes a straight line connecting the viewpoint P and an arbitrary point on the subject to intersect the plane $\Omega$.

In addition, for the convenience of description, it is assumed that all arbitrary points on the plane $\Omega$ are viewpoints and captured image data of the subject is acquired by the I/O display 1, and that light rays rectilinearly propagates without attenuation in a space (medium) where an observer is to observe the subject.

The trajectories of light rays as the subject is viewed from the viewpoint P (the trajectories of light rays incident on the viewpoint P from the subject) can be respectively expressed by straight lines which pass the optical axes of the corresponding microlenses and connect the viewpoint P and the respective points on the subject (as shown by dashed-line arrows in FIG. 15). Since these light rays necessarily intersect the plane $\Omega$, pixel values corresponding to light rays propagating along trajectories coincident with those respective light rays (the same light ray information as light ray information obtained when the subject is viewed from the viewpoint P) are necessarily acquired by the I/O display 1.

Namely, it is assumed here that Qi denotes the point of intersection of the plane $\Omega$ and a straight line Li connecting the viewpoint P and a certain point Ri on the subject. In this case, since the arbitrary points on the plane $\Omega$ are set as viewpoints and the captured image data of the subject is acquired by the I/O display 1, image data of the subject captured by using the point Qi as a viewpoint is also acquired by the I/O display 1.

Furthermore, in this case, since light rays rectilinearly propagate and do not attenuate, a light ray which is incident on the point Qi on the plane $\Omega$ from the point Ri on the subject is the same as a light ray incident on the viewpoint P.

Accordingly, as the subject is viewed from the viewpoint P, pixel values corresponding to the light ray propagating to the viewpoint P from the point Ri on the subject coincide with pixel values corresponding to the light ray propagating from the point Ri to the point Qi, and the pixel values corresponding to the light ray propagating from the point Ri to the point Qi are acquired by the I/O display 1.

Accordingly, pixel values as the point Ri on the subject is viewed from the viewpoint P can be obtained from the image data captured by using the point Qi as a viewpoint.

Pixel values as other points on the subject are viewed from the viewpoint P can also be obtained from image data captured by using points on the plane $\Omega$ as viewpoints, so that if there exists image data captured by using an arbitrary point on the plane $\Omega$ as a viewpoint, it is possible to obtain image data of the subject who is viewed from the viewpoint P, by selecting pixel values corresponding to light rays having the same light ray information as light ray information connecting the viewpoint P and the subject, from the pixel values of pixels constituting the captured image data.

In addition, when the viewpoint P is a viewpoint of the user #2, a stereoscopic image of the user #1 can also be obtained in a space on the side of the I/O display 2 similarly to the case where the user #1 is viewed from the viewpoint P in a space on the side of the I/O display 1, by selecting, from the pixel values of individual pixels constituting image data transmitted from the I/O display 1 to the I/O display 2, pixel values corresponding to light rays having the same light ray information as light ray information connecting the viewpoint P and the subject (the position where the user #1 is located in the space on the side of the I/O display 1), and reproducing (displaying) the obtained image data on the I/O display 2.

FIG. 16 is a view showing an example of the operation of each pixel.

For example, the operation of each pixel is controlled so that an image capture operation is performed by the whole pixels contained in a predetermined number of rows during one frame and a display operation is performed by the whole pixels contained in a predetermined number of rows during the same frame and different from the pixels performing the image capture operation. Accordingly, image capture and display are performed at the same time in one frame of display (image capture) period.

In the example shown in FIG. 12, a display operation is performed by the whole pixels contained in the $Y_1$-th row to the $(Y_1-y_1)$-th row, while an image capture operation is performed by the whole pixels contained in the $Y_2$-th row to the $(Y_2-y_2)$-th row.

In additions, each row which is made to perform one of a display operation and an image capture operation is switched row by row ever frame period in ascending order like the Y-th row, the (Y+1)-th row, the (Y+2)-th row, . . . , and when this switching operation reaches the bottom row of the I/O display 1, the switch operation returns to the top row and starts to repeat from the top row. Accordingly, during a display (image capture) period for a predetermined number of frames, image capture and image display are performed by all the pixels constituting the I/O display 1.

Accordingly, monocular images of the subject (the user #1) are obtained by the number of the microlenses from viewpoints corresponding to the positions of the respective microlenses.

At the same time that the image of the user #1 is captured, monocular images of the user #2 can be displayed by the number of the microlenses, whereby reproduction of a stereoscopic image of the user #2 is performed.

By switching the rows of pixels performing image capture and the rows of pixels performing image display at a period of, for example, 30 Hz or 60 Hz from the top row to the bottom row of the I/O display 1, it is possible to capture an image of the user #2 without allowing the user #1 to recognize the presence of pixels which do not display an image, but perform an image capture operation.

In the above-mentioned manner, each of the I/O display 1 and the I/O display 2 performs image capture (IN) of the corresponding one of the subjects and reproduction (OUT) of a stereoscopic image based on an image transmitted from the other.

Figure 17:
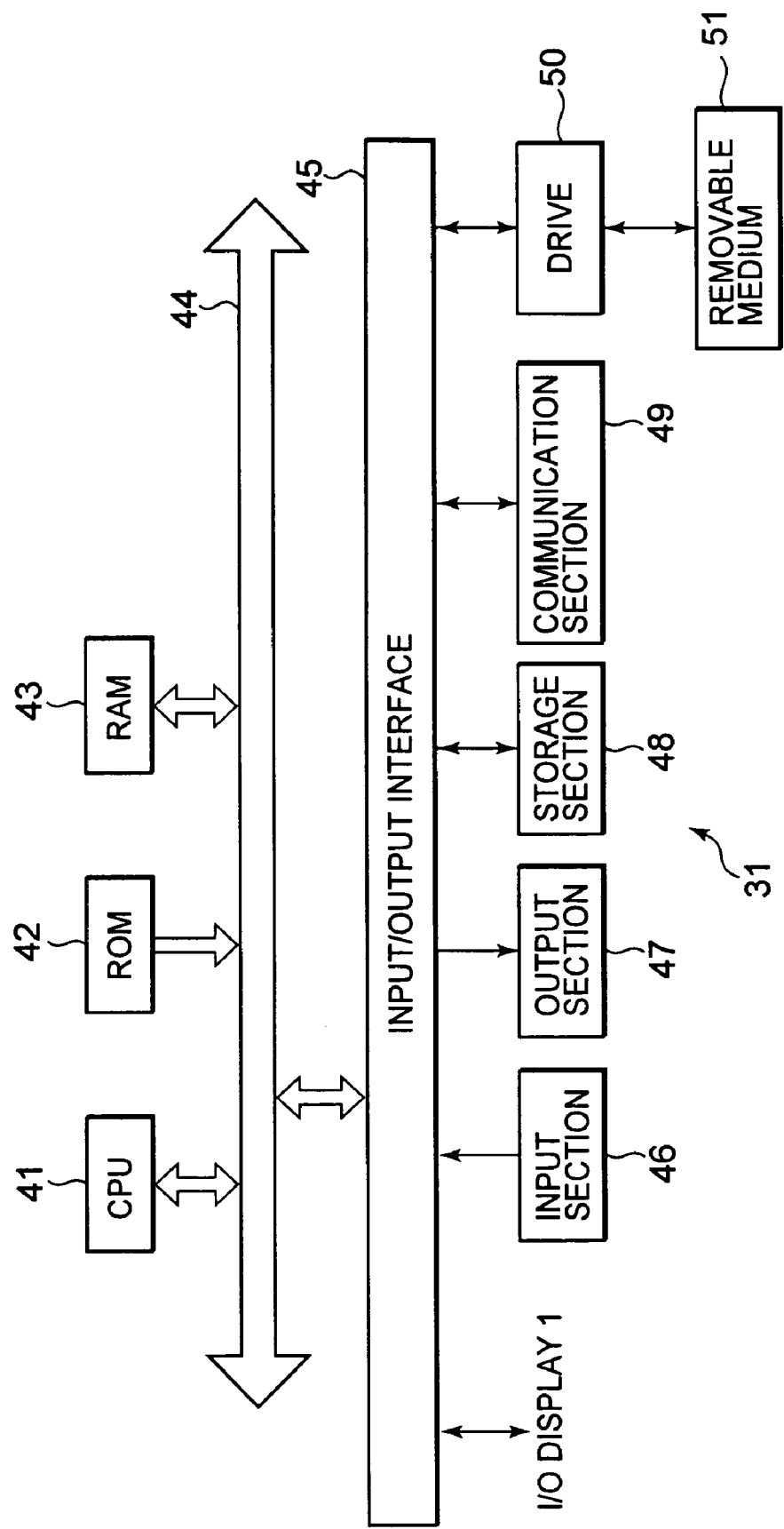
FIG. 17 is a block diagram showing a construction example of an information processing apparatus.

FIG. 17 is a block diagram showing a construction example of an information processing apparatus 31 disposed in the I/O display 1. The I/O display 2 is also provided with an information processing apparatus having a similar construction.

In addition, the information processing apparatus 31 may be formed integrally with the I/O display 1, and may also be formed as a separate unit.

A CPU (Central Processing Unit) 41 executes various kinds of processing in accordance with a program stored in a ROM (Read Only Memory) 42 or a program loaded from a storage section 48 to a RAM (Random Access Memory) 43. The RAM 43 also stores data necessary for the CPU 41 to execute various kinds of processing, as required.

The CPU 41, the ROM 42 and the RAM 43 are connected to one another via a bus 44. An input/output interface 45 is also connected to the bus 44.

Connected to the input/output interface 45 are an input section 46 including the I/O display 1, a keyboard, a mouse and the like, an output section 47 including a speaker, a storage section 48 including a hard disk drive, and a communication section 49 which performs communication via the communication channel 3.

A drive 50 is also connected to the input/output interface 45 as required. A removable medium 51 made of a magnetic disk, an optical disk, a magnetooptical disk, a semiconductor memory or the like is fitted into the drive 50 as required, and a computer program read from the removable medium 51 is installed into the storage section 48 as required.

FIG. 18 is a block diagram showing a function construction example of the information processing apparatus 31. At least part of the construction shown in FIG. 18 is realized by a predetermined program being executed by the CPU 41 of FIG. 17.

A detection section 61 detects the outputs from pixels performing an image capture operation, among the pixels of the I/O display 1, and detects whether each of the detected pixels is irradiated by external light, as well as the amount of light irradiated. The result (pixel values) of detection by the detection section 61 is outputted to a monocular image generation section 62.

An image-capture-area setting section 81 of the detection section 61 controls the drive of the pixels of the I/O display 1, and sets an image capture area. Namely, the image-capture-area setting section 81 applies a voltage near, for example, 0 V to pixels which are to be caused to perform image capture, thereby causing the pixels to form an image capture area.

The monocular image generation section 62 synthesizes the pixel values of the respective pixels and generates monocular images, on the basis of the detection result supplied from the detection section 61. Image data of the monocular images generated by the monocular image generation section 62 are outputted to an image processing section 63.

On the basis of the image data supplied from the monocular image generation section 62, the image processing section 63 performs image processing on each of the monocular images, and causes a buffer 64 to store image data obtained from the image processing.

For example, if captured monocular images are displayed without modification, an image inverted in depth, i.e., in the relationship between projections and depressions, will be reproduced as a stereoscopic image. Accordingly, the image processing section 63 performs the processing of converting the inverted image to an erected image. The reason why an image inverted in the relationship between projections and depressions is reproduced is that a captured image of the right side of the subject is observed by an observer from the left side.

When image data for a predetermined number of monocular images are stored into the buffer 64, a compression/expansion processing section 65 compresses the image data of the monocular images and outputs the obtained compressed data to a transmission/reception control section 66.

Since the monocular images are extremely similar to one another, the compression/expansion processing section 65 forms into one group both a predetermined number of (for example, 5×5) monocular images containing one monocular image, which is acquired at a particular position and serves as a reference, and monocular images respectively acquired at positions surrounding the reference monocular image, and performs compression of image data in such a way that as to the reference monocular image, the whole image is transmitted as image data compressed in a JPEG (Joint Photographic Expert Group) format or the like, and as to the other 24 monocular images, only difference data from the reference monocular image are transmitted.

In addition, when image data captured by the I/O display 2 are supplied to the compression/expansion processing section 65 via the transmission/reception control section 66, the compression/expansion processing section 65 expands the image data and causes a buffer 67 to store the obtained expanded image data. The image data stored in the buffer 67 are, for example, image data of monocular images of the user #2.

The transmission/reception control section 66 control communication with the I/O display 2 via the communication section 49 shown in FIG. 17 and the communication channel 3. The transmission/reception control section 66 transmits the image data supplied from the compression/expansionprocessing section 65 to the I/O display 2 (the information processing apparatus 31 of the I/O display 2), and also outputs the image data transmitted from the I/O display 2 to the compression/expansion processing section 65.

A display control section 68 causes pixels performing a display operation on the basis of the image data of the monocular images captured by the I/O display 2 and stored in the buffer 67 to display the monocular image. Areas in which the respective monocular images are displayed by the display control section 68 are areas located at positions corresponding to the respective areas of the I/O display 2 in which the monocular images are captured.

A display area setting section 91 of the display control section 68 controls the drive of the pixels of the I/O display 1, and sets display areas. Namely, the display area setting section 91 applies a forward voltage to pixels to be caused to perform image display, and causes the pixels to form display areas.

The operation of the information processing apparatus 31 will be described below with reference to the flowcharts of FIGS. 19 and 20. Incidentally, the image capture processing of FIG. 19 and the display processing of FIG. 20 are performed in parallel.

First, the image capture processing of the information processing apparatus 31 will be described below with reference to the flowchart of FIG. 19.

In step S1, the image-capture-area setting section 81 of the detection section 61 applies a voltage near, for example, 0 V to pixels of the I/O display 1 which are to be caused to perform image capture, and sets an image capture area.

In step S2, the detection section 61 performs image capture of the subject, i.e., detects the outputs from pixels which are performing an image capture operation, among the pixels of the I/O display 1, and detects whether each of the pixels is irradiated by external light, and the amount of light irradiated. Pixel values which are the result of detection by the detection section 61 are outputted to the monocular image generation section 62.

In step S3, the monocular image generation section 62 generates monocular images on the basis of the detection result supplied from the detection section 61. The image data of the generated monocular images are outputted to the image processing section 63.

In step S4, the image processing section 63 performs predetermined image processing on each of the monocular images on the basis of the image data supplied from the monocular image generation section 62, and causes the buffer 64 to store the obtained processed image data. The details of the image processing will be described later with reference to FIG. 35.

When image data for a predetermined number of monocular images are stored into the buffer 64, the compression/expansion processing section 65 compresses the image data of the respective monocular images in step S5 and outputs the obtained compressed data to the transmission/reception control section 66. As mentioned above, the compression of step S5 forms a predetermined number of (for example, 5×5 (25)) monocular images including one central reference monocular image into one group, and performs compression of the image data in such a way that as to the reference monocular image, the whole image data are transmitted, and as to the other 24 monocular images, only difference data from the reference monocular image are transmitted.

In step S6, the transmission/reception control section 66 controls the communication section 49 of FIG. 17 to transmit the compressed image data of the monocular images of the user #1 to the I/O display 2 via the communication channel 3, and the process is brought to an end.

The above-mentioned processing is repeated, and pixels which constitute image capture areas are sequentially switched, whereby monocular images of the user #1 are obtained from viewpoints respectively corresponding to a plurality of points on the I/O display 1 by the I/O display 1 (the information processing apparatus 31).

The display processing of the information processing apparatus 31 to reproduce a stereoscopic image will be described below with reference to the flowchart of FIG. 20.

In step S11, the transmission/reception control section 66 receives image data transmitted from the I/O display 2, and outputs the received image data to the compression/expansion processing section 65.

In step S12, the compression/expansion processing section 65 expands the image data transmitted from the I/O display 2, and causes the buffer 67 to store the obtained expanded image data.

In step S13, the display area setting section 91 of the display control section 68 applies a forwardvoltage to pixels of the I/O display 1 which are to be caused to perform a display operation, thereby setting a display area. The display area is set at a position different from the image capture area set in step S1 of FIG. 9.

The display control section 68 causes the pixels constituting the display area to display monocular images, on the basis of the image data stored in the buffer 67. The area in which the monocular images are displayed by the display control section 68 are areas which are located at positions corresponding to the areas of the I/O display 2 in which the respective monocular images are captured.

The above-mentioned processing is repeated, and pixels which constitute display areas are sequentially switched, whereby a stereoscopic image of the user #2 is reproduced by the I/O display 1.

The above-mentioned processing of FIGS. 19 and 20 is also performed in the I/O display 2, whereby the user #2 who uses the I/O display 2 can also view a stereoscopic image of the user #1 and perform communication therewith in real time.

In addition, since image capture and image display are performed by one I/O display, the user #1 and the user #2 can perform communication with eye-to-eye contact, i.e., as the user #1 is viewing the eyes of the user #2 reproduced by the I/O display 1 and the user #2 is viewing the eyes of the user #1 reproduced by the I/O display 2. Accordingly, it is possible to solve the drawback of noncoincident visual lines which has been a disadvantage of communications between remote locations.

In addition, from the viewpoint of solutions to the drawback of noncoincident visual lines, the images of communication parties reproduced by the respective I/O displays are not limited to stereoscopic images.

FIG. 21 is a view showing a construction example of a communication system to which the present invention is applied. The construction itself is similar to that shown in FIG. 1.

Namely, an image (plane image) of the user #2 captured by the I/O display 2 is displayed on the I/O display 1 in real time, and the user #1 can communicate with the I/O display 2 while viewing the eyes of the user #2 disposed on the I/O display 1.

In addition, as mentioned above, an image of the user #1 who is viewing the eyes of the displayed user #2 is captured by the I/O display 1, and the captured image is reproduced on the I/O display 2. Accordingly, the user #2 can also communicate with the user #1 while viewing the eyes of the user #1 whose image is displayed on the I/O display 2 and who is viewing the eyes of the user #2.

In this manner, it is also possible to solve the problem of noncoincident visual lines not by reproducing stereoscopic images but by merely displaying an image of a subject captured by one I/O display on another I/O display.

In this case, microlens arrays are not needed, and one lens may be disposed in an I/O display so that one image can be obtained.

In the above-mentioned construction, each pixel is provided with a TFT, but may be provided with any kind of transistor as long as it can generate a leak current according to the reception of external light and can switch on and off to switch the operation of a pixel.

In the above-mentioned construction, the processing of converting captured monocular images into erected images is performed by the information processing apparatus 31 of the I/O display 1 if the monocular images are captured by the I/O display 1, and by the information processing apparatus 31 of the I/O display 2 if the monocular images are captured by the I/O display 2; that is to say, the conversion processing is performed by the information processing apparatus 31 located on an image capture side. However, this processing may also be performed by the information processing apparatus 31 on an image display side where the monocular images are received.

In this case, the monocular images of the user #1 captured by the I/O display 1 are transmitted to the information processing apparatus 31 of the I/O display 2 in their inverted states, and are converted into erected images by the information processing apparatus 31 of the I/O display 2 and the erected images are displayed on the I/O display 2. Conversely, the monocular images of the user #2 captured by the I/O display 2 are transmitted to the information processing apparatus 31 of the I/O display 1 in their inverted states, and are converted into erected images by the information processing apparatus 31 of the I/O display 1, and the erected images are displayed on the I/O display 1.

Furthermore, the image processing which is performed on the image capture side or the image display side in this manner is not limited to the processing of converting an inverted image to an erected image, and can also be constructed to perform other processing such as enlargement and reduction.

First, the case where monocular images obtained by enlarging or reducing captured monocular images are used to reproduce a stereoscopic image will be described. If monocular images adjusted in size by enlargement or reduction are used for reproduction of a stereoscopic image, the reproduction position of the stereoscopic image can be adjusted.

Figure 22:
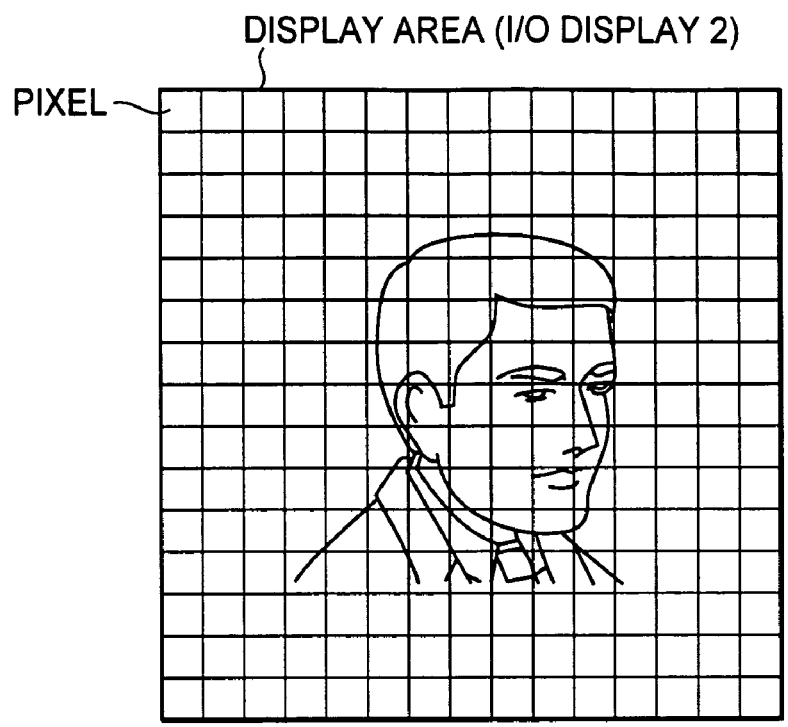
FIG. 22 is a view showing a monocular image example displayed in a display area.
Figure 23:
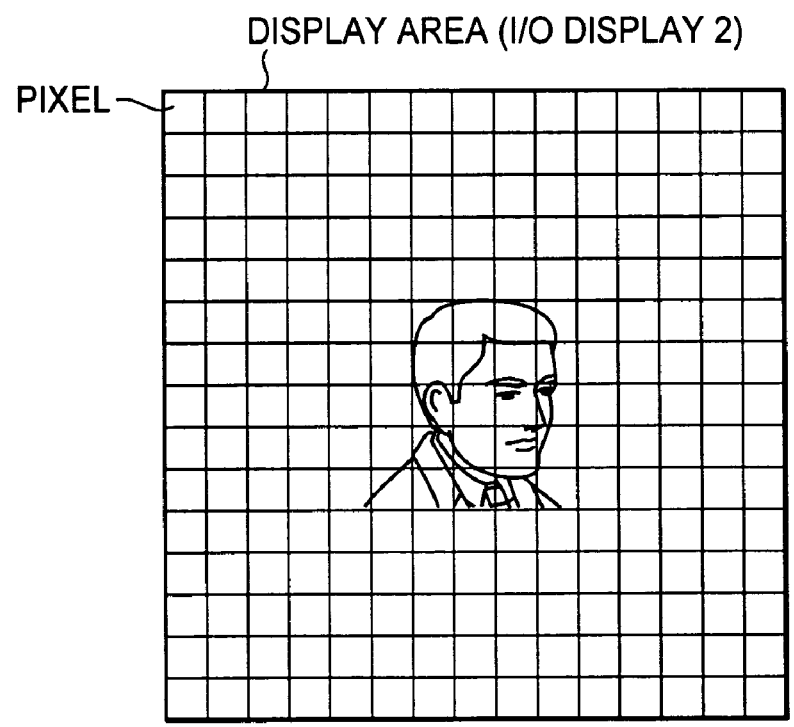
FIG. 23 is a view showing another monocular image example displayed in a display area.
Figure 24:
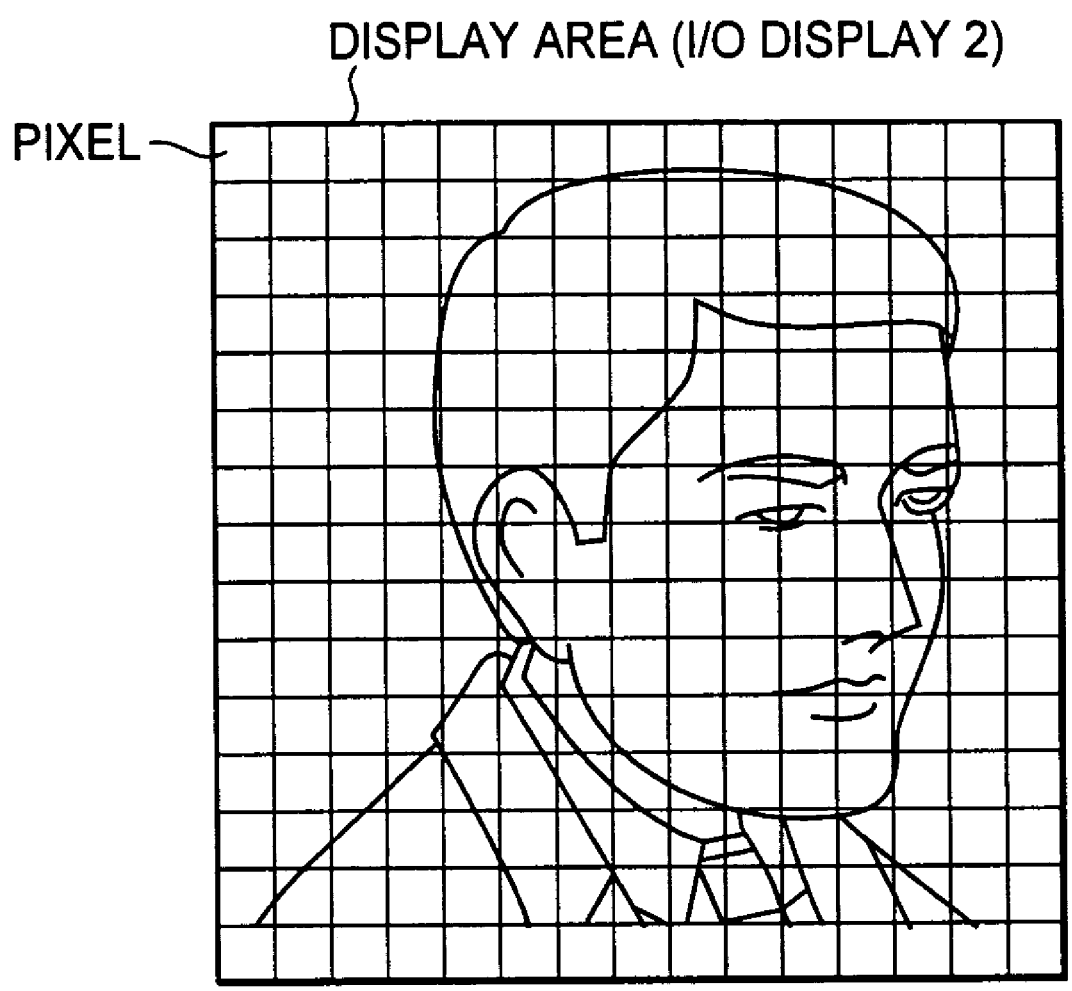
FIG. 24 is a view showing still another monocular image example displayed in a display area.

FIGS. 22 to 24 are views showing different examples of the size of a monocular image displayed in one display area during the reproduction of a stereoscopic image.

Since a monocular image of the user #1 is displayed in each of the display areas shown in FIG. 22 to 24, the display in which these display areas are formed is the I/O display 2.

The monocular image of FIG. 22 is an image larger than the monocular image of FIG. 23 and smaller than the monocular image of FIG. 24. An image of a subject formed in one image capture area by a microlens varies in size according to conditions such as the distance from the image capture area (I/O display surface) to the subject, and the monocular image of FIG. 22 is, for example, an image merely captured, i.e., an image not subjected to enlargement or reduction processing.

The monocular image of FIG. 23 is the smallest image of the monocular images shown in FIGS. 22 to 24, and is obtained by reducing the monocular image of FIG. 22. The monocular image of FIG. 24 is the largest image of the monocular images shown in FIGS. 22 to 24, and is obtained by enlarging the monocular image of FIG. 22.

For example, each monocular image (a monocular image having the size shown in FIG. 22) of the user #1 captured by the I/O display 1 which is a display located on an image capture side is converted to an erected image, and then, if desired, reduction processing is performed to adjust the monocular image to the size shown in FIG. 23 or enlargement processing is performed to adjust the monocular image to the size shown in FIG. 24. After that, the obtained images are displayed in the respective areas of the I/O display 2 which is a display located on an image display side.

FIG. 25 is a view showing a stereoscopic image of the user #1 reproduced by the monocular images of FIG. 22 being displayed on the I/O display 2 which is the display located on the image display side. The monocular images of the user #1 captured by the I/O display 1 are not subjected to enlargement or reduction processing.

As described previously with reference to FIG. 12, the monocular images, which are captured by the respective image capture areas of the I/O display 1 and are inverted, are displayed in the corresponding display areas of the I/O display 2, whereby the user #2 who is an observer can observe as if the stereoscopic image of the user #1 were reproduced beyond the I/O display 2 (light rays propagating toward the user #2 from the position of the stereoscopic image of the user #1 shown by dashed lines in FIG. 25 are reproduced by the I/O display 2).

It is assumed here that, as shown in FIG. 25, a distance $L_1$ denotes the distance between the I/O display 2 and the stereoscopic image of the user #1 which is reproduced by the monocular images of FIG. 22 being displayed in the respective display areas.

Figure 26:
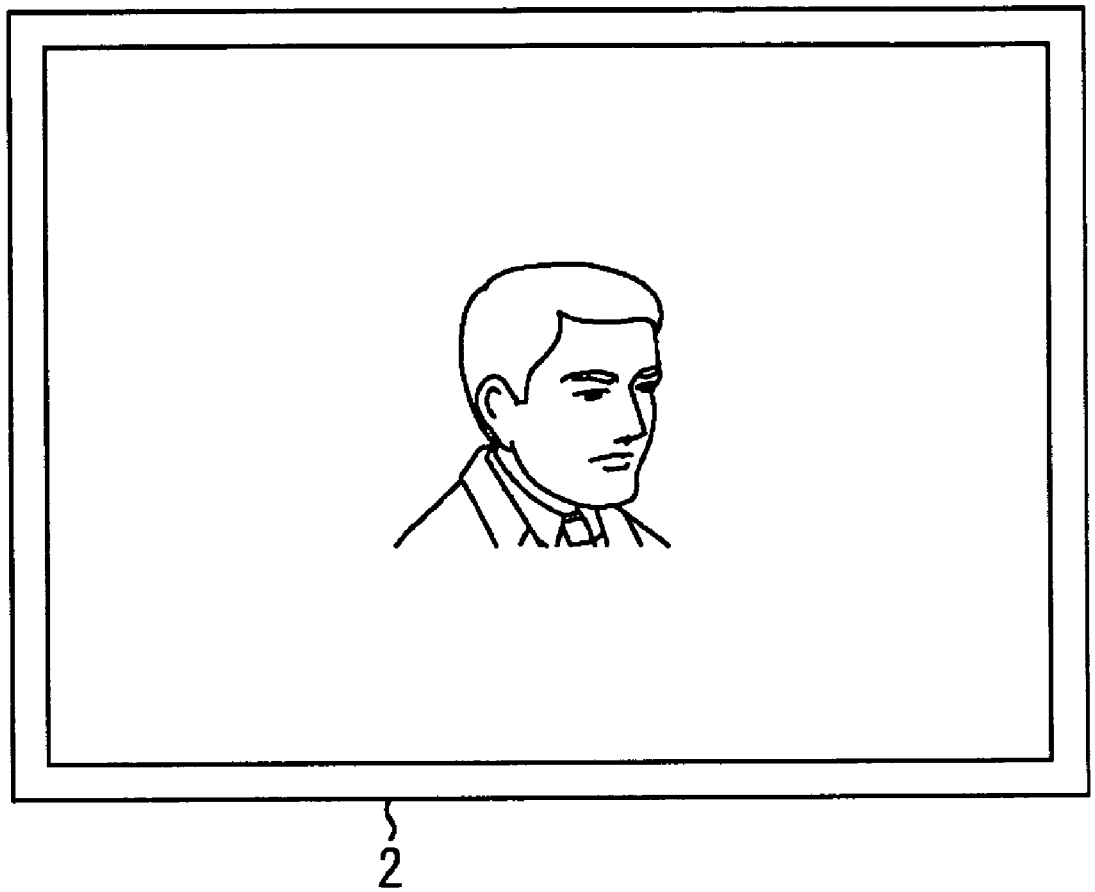
FIG. 26 is a view showing a display example of the stereoscopic image.

FIG. 26 is a view showing a display example of the I/O display 2 (how the stereoscopic image of the user #1 is viewed by the user #2) in the case where the stereoscopic image is reproduced at the position of the distance $L_1$ from the I/O display 2 as shown in FIG. 25.

As shown in FIG. 26, the user #2 can observe the stereoscopic image of the user #1 which has a size corresponding to the distance $L_1$. The picture of the user #1 shown in FIG. 26 represents the stereoscopic image. The vertical length of the image of FIG. 26 is equivalent to the length from the point of intersection of the I/O display 2 and a straight line extending from the top end of the stereoscopic image of the user #1 of FIG. 25 to the eyes of the user #2 to the point of intersection of the I/O display 2 and a straight line extending from the bottom end of the stereoscopic image to the eyes of the user #2.

Figure 27:
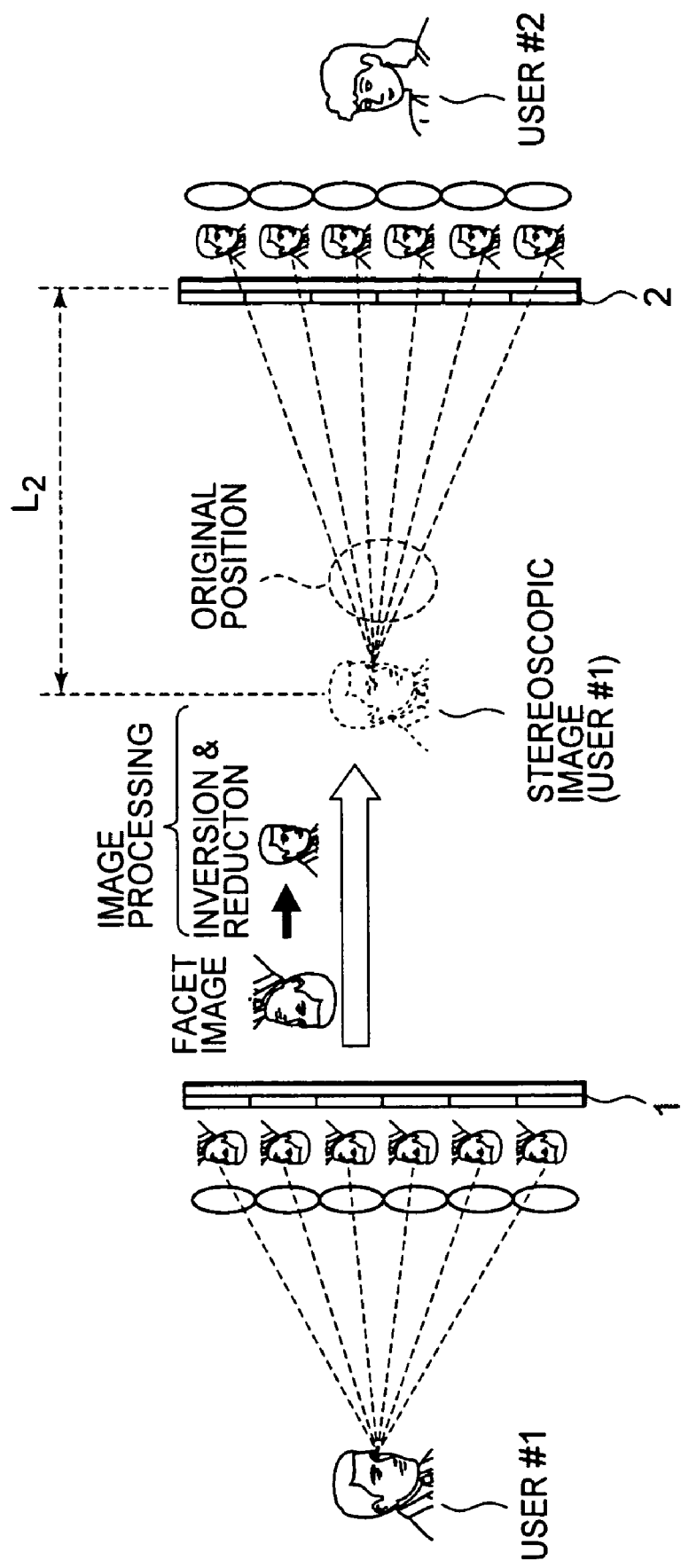
FIG. 27 is a view showing a stereoscopic image reproduced by the monocular image of FIG. 23 being displayed.

FIG. 27 is a view showing a stereoscopic image of the user #1 reproduced by the monocular images (small monocular images) of FIG. 23 being displayed on the I/O display 2.

Monocular images, which are captured by the respective image capture areas of the I/O display 1 and are subjected to inversion processing and reduction processing, are displayed in the corresponding display areas formed in the I/O display 2, whereby the user #2 who is an observer can observe as if a stereoscopic image of the user #1 were reproduced beyond the I/O display 2 at a position farther than the position reproduced by the monocular images of FIG. 22 (light rays propagating toward the user #2 from the position of the stereoscopic image of the user #1 shown by dashed lines in FIG. 27 are reproduced by the I/O display 2).

Namely, as shown in FIG. 27, the distance between the I/O display 2 and the stereoscopic image of the user #1 which is reproduced by the monocular images of FIG. 23 being displayed in the respective display areas becomes a distance $L_2$ longer than the distance $L_1$ of FIG. 25. In FIG. 27, the dashed-line circle shown between the stereoscopic image of the user #1 and the I/O display 2 indicates an original position where the stereoscopic image should be reproduced if the reduction of the monocular images is not performed, i.e., the position of the stereoscopic image of the user #1 of FIG. 25.

Figure 28:
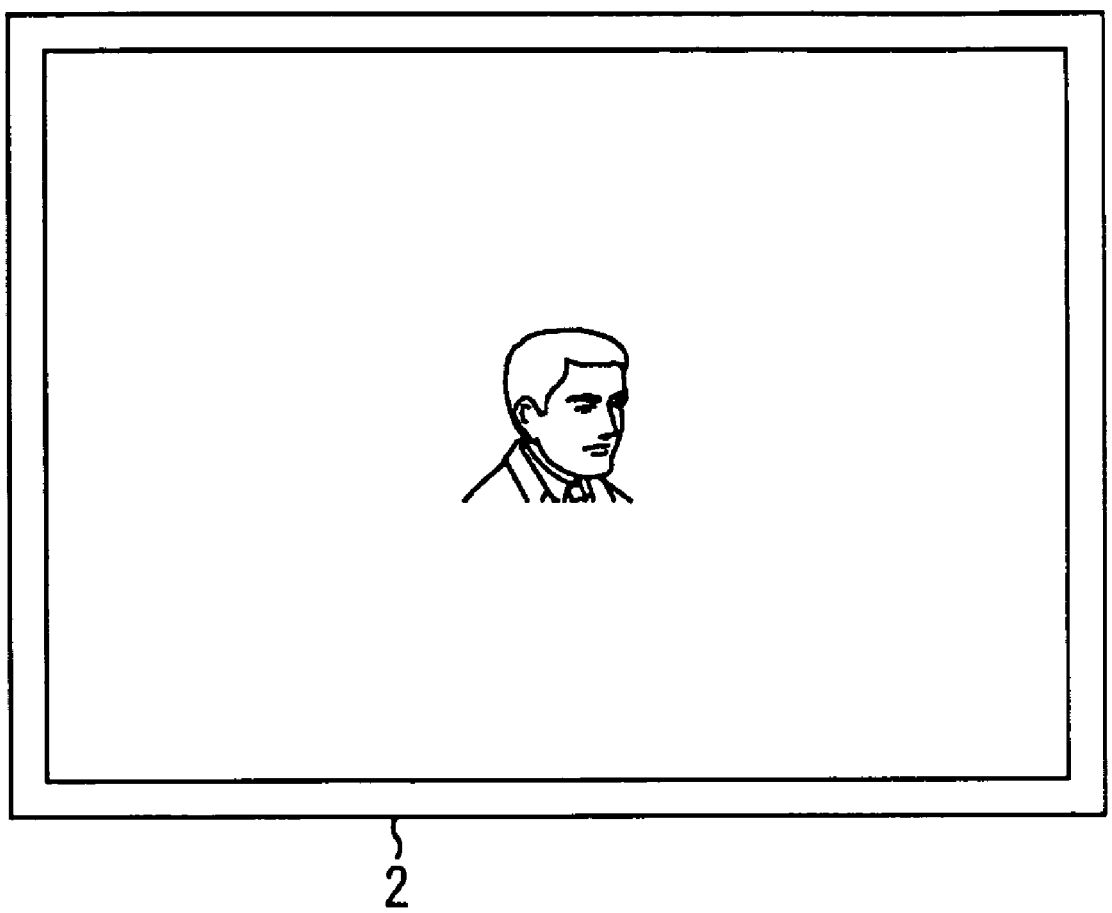
FIG. 28 is a view showing another display example of the stereoscopic image.

FIG. 28 is a view showing a display example of the I/O display 2 in the case where the stereoscopic image of the user #1 is reproduced at the position of the distance $L_2$ from the I/O display 2.

In this case, the stereoscopic image is reproduced at a position farther than the case shown in FIG. 26, so that the user #2 can observe a stereoscopic image smaller than the stereoscopic image of FIG. 26, as shown in FIG. 28. The picture of the user #1 shown in FIG. 28 also represents the stereoscopic image. The vertical length of the image of FIG. 28 is equivalent to the length from the point of intersection of the I/O display 2 and a straight line extending from the top end of the stereoscopic image of the user #1 of FIG. 27 to the eyes of the user #2 to the point of intersection of the I/O display 2 and a straight line extending from the bottom end of the stereoscopic image to the eyes of the user #2.

Figure 29:
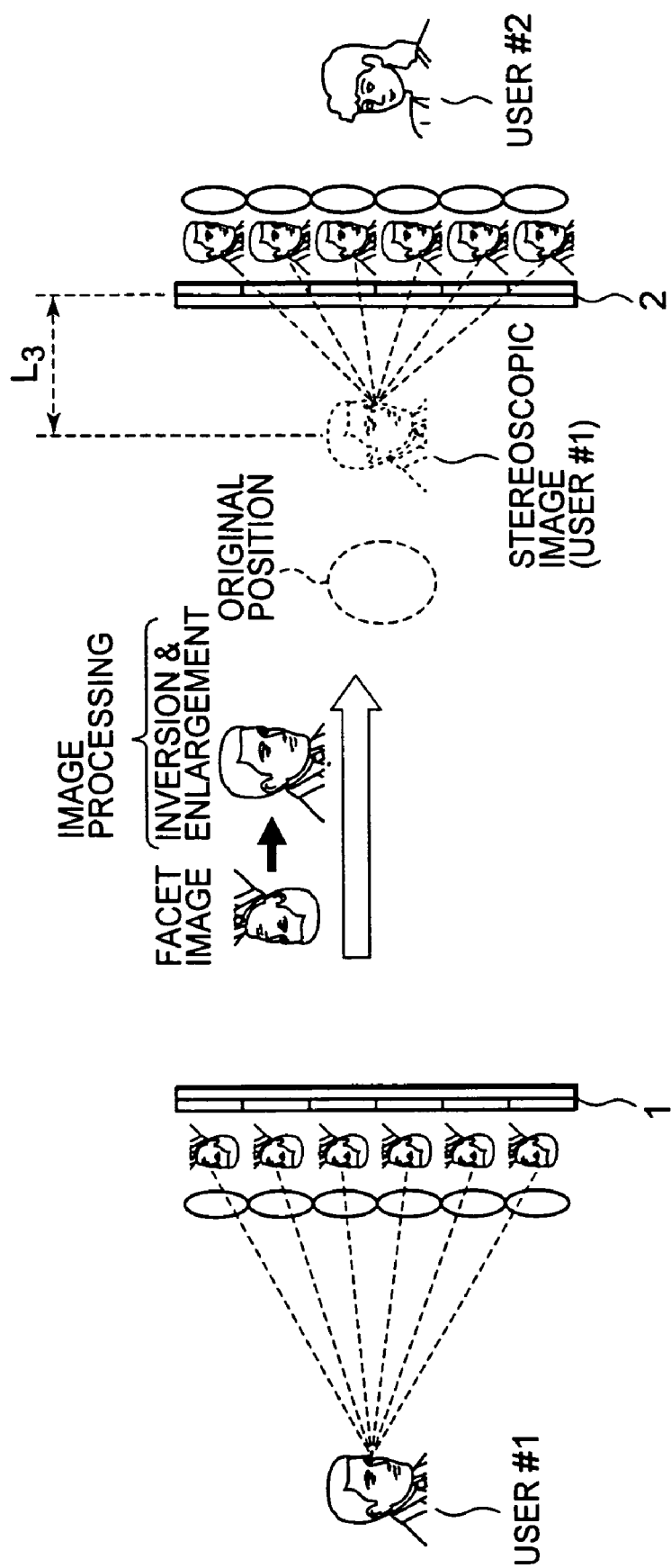
FIG. 29 is a view showing a stereoscopic image reproduced by the monocular image of FIG. 24 being displayed.

FIG. 29 is a view showing a stereoscopic image of the user #1 reproduced by the monocular images (large monocular images) of FIG. 24 being displayed on the I/O display 2.

Monocular images, which are captured by the respective image capture areas of the I/O display 1 and are subjected to inversion processing and enlargement processing, are displayed in the corresponding display areas formed in the I/O display 2, whereby the user #2 who is an observer can observe as if a stereoscopic image of the user #1 were reproduced beyond the I/O display 2 at a position nearer than the position reproduced by the monocular images of FIG. 22 (light rays propagating toward the user #2 from the position of the stereoscopic image of the user #1 shown by dashed lines in FIG. 29 are reproduced by the I/O display 2).

Namely, the distance between the I/O display 2 and the stereoscopic image of the user #1 which is reproduced when the monocular images of FIG. 24 are displayed in the respective display areas becomes a distance $L_3$ shorter than the distance $L_1$ of FIG. 25. In FIG. 29, the dashed-line circle shown at a position farther than the stereoscopic image of the user #1 from the I/O display 2 indicates an original position where the stereoscopic image should be reproduced if the enlargement of the monocular images is not performed, i.e., the position of the stereoscopic image of the user #1 of FIG. 25.

Figure 30:
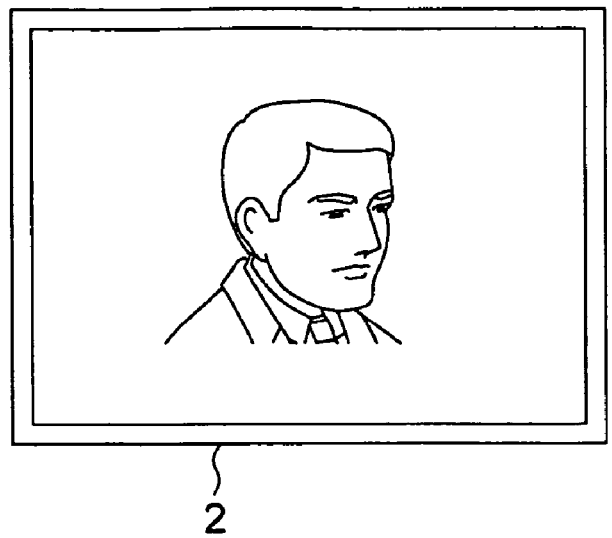
FIG. 30 is a view showing still another display example of the stereoscopic image.

FIG. 30 is a view showing a display example of the I/O display 2 in the case where the stereoscopic image of the user #1 is reproduced at the position of the distance $L_3$ from the I/O display 2.

In this case, the stereoscopic image is reproduced at a position nearer than the case shown in FIG. 26, so that the user #2 can observe a stereoscopic image larger than the stereoscopic image of FIG. 26, as shown in FIG. 30. The picture of the user #1 shown in FIG. 30 also represents the stereoscopic image. The vertical length of the image of FIG. 30 is equivalent to the length from the point of intersection of the I/O display 2 and a straight line extending from the top end of the stereoscopic image of the user #1 of FIG. 29 to the eyes of the user #2 to the point of intersection of the I/O display 2 and a straight line extending from the bottom end of the stereoscopic image to the eyes of the user #2.

As mentioned above, the reproduction position of a monocular image can be adjusted by adjusting the size of each monocular images displayed in a respective one of the display areas.

The adjustment of the reproduction position of a feet monocular image is used in the case where, for example, an I/O display for reproducing a stereoscopic image is small.

As mentioned above, when the I/O display 2 is to view the entire stereoscopic image (the face and the vicinity thereof) reproduced at the position away from the I/O display 2 by the distance $L_1$ as shown in FIG. 25 by way of example, if it is assumed that the user #2 does not change his/her position, the vertical length of the I/O display 2 need be equivalent to at least the length from the point of intersection of the I/O display 2 and a straight line extending from the top end of the stereoscopic image of the user #1 to the eyes of the user #2 to the point of intersection of the I/O display 2 and a straight line extending from the bottom end of the stereoscopic image to the eyes of the user #2.

In addition, the horizontal length of the I/O display 2 need be equivalent to at least the length from the point of intersection of the I/O display 2 and a straight line extending from the left end of the stereoscopic image of the user #1 (the left end of the stereoscopic image of the user #1 as viewed from the user #2) to the eyes of the user #2 to the point of intersection of the I/O display 2 and a straight line extending from the right end of the stereoscopic image to the eyes of the user #2.

Figure 31:
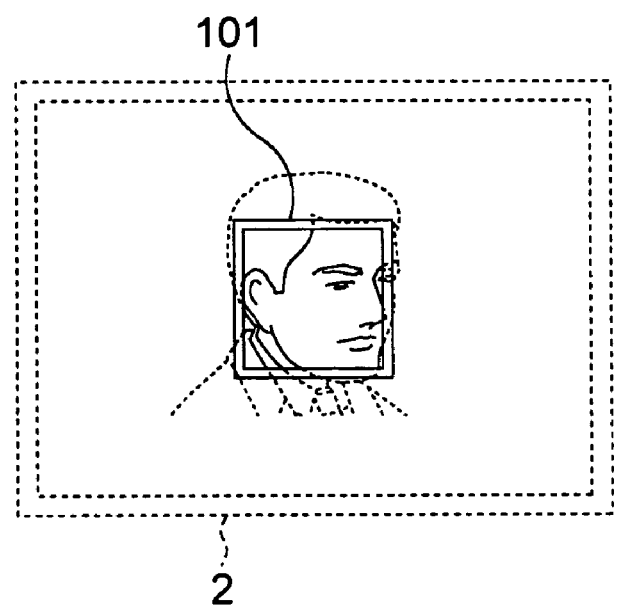
FIG. 31 is a view showing a display example in the case where an I/O display is small.

From this fact, in the case where an I/O display for reproducing a stereoscopic image of the user #1 is an I/O display 101 which only has a display area smaller than the minimum required display area, as shown in FIG. 31, if the reduction processing of monocular images is not performed, the user #2 who uses this I/O display 101 cannot view the whole of a reproduced stereoscopic image of the user #1. Namely, there is a case where the user #2 finds it difficult to communicate with a communication party with eye-to-eye contact.

In FIG. 31, dashed lines indicate the size of the I/O display 2. In the stereoscopic image of the user #1, the area shown by solid lines indicates an area which the user #1 can view by using the I/O display 101, and the area shown by dashed lines indicates an area which the user #2 cannot view. The I/O display 101 is a display having a construction similar to that of each of the I/O displays 1 and 2, and is capable of capturing monocular images of the user #2 who uses the I/O display 101 and transmitting the monocular images to the I/O display 1, and is also capable of reproducing a stereoscopic image of the user #1 on the basis of data transmitted from the I/O display 1.

Accordingly, if the user #2 who is an observer cannot view both the face of the reproduced stereoscopic image of the user #1 and the vicinity of the face, the reproduction position of the stereoscopic image is adjusted to a position farther from the I/O display 101, as described with reference to FIG. 27, so that the user #2 can view both the face and the vicinity thereof.

Figure 32:
FIG. 32 is a view showing another display example in the case where an I/O display is small.

FIG. 32 is a display example of the I/O display 101 in the case where the reproduction position of the stereoscopic image of the user #1 is adjusted to a position farther from the I/O display 101. In FIG. 32, the I/O display 2 shown by the dashed lines in FIG. 31 is omitted.

Since monocular images as shown in FIG. 24 are displayed in the respective display areas of the I/O display 101 in the above-mentioned manner, the number of displayable monocular images decreases, so that the resolution of the stereoscopic image lowers and the range of viewing angles is limited. However, in the I/O display 101 as well, it is possible to reproduce a stereoscopic image similar to the stereoscopic image shown in FIG. 28, the whole of which can be viewed by the user #2. Accordingly, the user #2 can communicate with the user #1 while viewing the entire face of the user #1.

In addition, even the I/O display 101 which is smaller than the I/O display 2 is capable of capturing monocular images of the user #2 and transmitting the monocular images to the information processing apparatus 31 of the I/O display 1, so that the user #1 can view a stereoscopic image of the user #2 reproduced by the I/O display 1.

In addition, the above-mentioned processing of enlarging monocular images and moving the reproduction position of a stereoscopic image toward an observer may also be used for the purposes of, for example, enlarging the size of a stereoscopic image able to be viewed by an observer, when the stereoscopic image is small with respect to the size of a display. During image capture, since monocular images are captured from the positions of individual microlenses, i.e., from a plurality of viewpoints, the distance from an I/O display located on an image capture side to a subject may be measured on the basis of the individual monocular images so that the reproduction position of a stereoscopic image is also adjusted on the basis of information on the distance.

Principles which make it possible to adjust the reproduction position of a stereoscopic image will be described below with reference to FIG. 33.

Figure 33:
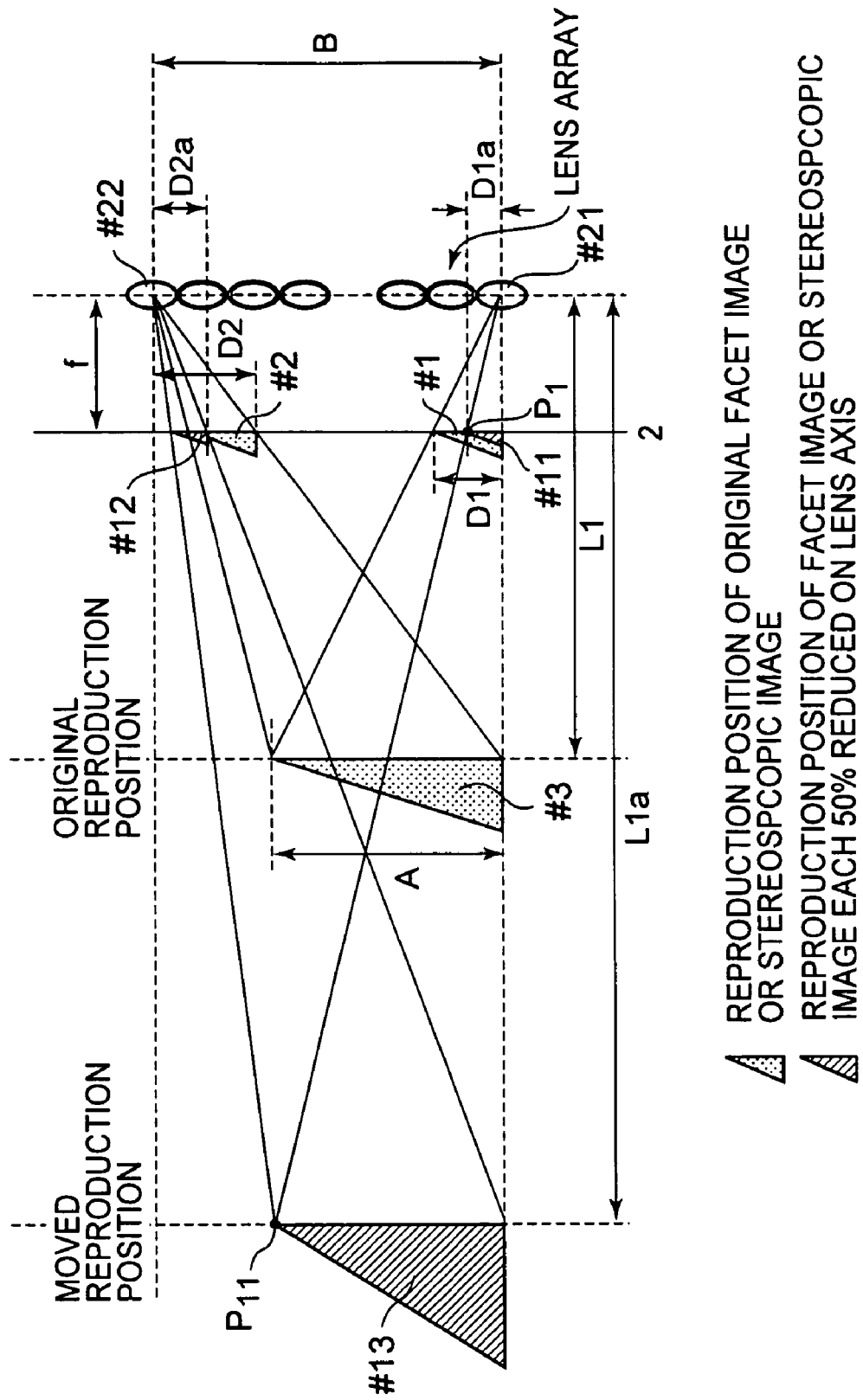
FIG. 33 is a view showing principals which make it possible to adjust a reproduction position of a stereoscopic image.

In FIG. 33, for the convenience of description, it is assumed that a display area is very wide with respect to one microlens. Monocular images and reproduced stereoscopic images are shown by triangles, respectively.

Triangles #1 and #2 which are gray colored triangles represent monocular images subjected to only inversion processing, and a triangle #3 represents a stereoscopic image which is reproduced by the triangles #1 and #2 (which seems to an observer to be reproduced by the triangles #1 and #2). The triangles #1 and #2 have the same size.

Triangles #11 and #12 which are hatched triangles represent monocular images subjected to not only inversion processing but also reduction processing (reduced to 50%), and a triangle #13 represents a stereoscopic image which is reproduced by the triangles #11 and #12. The triangles #11 and #12 have the same size.

In FIG. 33, symbol f denotes the distance from a lens array plane to the display surface (pixel surface) of the I/O display 2, and the following description focuses on light rays which reach the eyes of the user #2 via microlenses #21 and #22. Symbol B denotes the distance between the microlenses #21 and #22.

It is assumed here that the base of the triangle #1 is located on the optical axis of the triangle #21, the base of the triangle #2 is located at a position away from the optical axis of the microlens #22 by D2, and the height of each of the triangles #1 and #2 is D1. Light rays which reach the eyes of the user #2 via the respective microlenses #21 and #22 when the triangles #1 and #2 are displayed on the I/O display 2 are virtually the same as light rays which leave the triangle #3 located at a position away from the lens array plane by a distance L1.

Accordingly, the user #2 can virtually view the triangle #3 located at the position away from the lens array plane by the distance L1. The height of the triangle #3 is A from the optical axis of the microlens #21.

In addition, it is assumed here that the base of the triangle #11 obtained by reducing the triangle #1 is located on the optical axis of the triangle #21, the base of the triangle #12 obtained by reducing the triangle #2 is located at a position away from the optical axis of the microlens #22 by D2a, and the height of each of the triangles #11 and #12 is D1a. Light rays which reach the eyes of the user #2 via the respective microlenses #21 and #22 when the triangles #11 and #12 are displayed on the I/O display 2 are virtually the same as light rays which leave the triangle #13 located at a position away from the lens array plane by a distance L1a(L1a>L1). For example, if the triangle 11# is displayed, a light ray which reaches the eyes of the user #2 from a point $P_{11}$ of the triangle 13# is reproduced by a light ray which reaches the eyes of the user #2 from a point $P_1$ of the triangle 11#. The distance L1a is a distance determined when the height of the triangle 13# is made equal to the height A of the triangle #3.

Accordingly, the user #2 can virtually view the triangle 13# located at the position away from the lens array plane by the distance L1a.

From the above description, the following formulas (1) and (2) are obtained:

$$f:D1=L1:A \quad (1)$$

$$f:D1a=L1a:A \quad (2)$$

From the formulas (1) and (2), the following formula (3) is obtained:

$$D1:D1a=L1a:L1 \quad (3)$$

In addition, the following formulas (4) and (5) are obtained:

$$f:D2=L1:B \quad (4)$$

$$f:D2a=L1a:B \quad (5)$$

From the following formulas (4) and (5), the following formula (6) is obtained:

$$D2:D2a=L1a:L1 \quad (6)$$

From the above formulas, it can be seen that if any of the monocular images is enlarged or reduced centered about the optical axis of the corresponding one of the microlenses, the reproduction position of the stereoscopic image can be changed.

In addition, an image which seems to be reproduced at a position more away from the I/O display 2 becomes an image which gives an observer a greater sensation of depth. In FIG. 33, the length of the base of the triangle #13 is greater than the length of the base of the triangle #3.

The image processing section 63 (FIG. 18) which performs the above-mentioned image processing will be described below.

FIG. 34 is a block diagram showing a construction example of the image processing section 63.

The image processing section 63 includes an inversion processing section 111 and an enlargement/reduction processing section 112. The inversion processing section 111 applies inversion processing centered about the optical axis of each of the microlenses to a respective one of the monocular images supplied from the monocular image generation section 62, and outputs the obtained monocular images to the enlargement/reduction processing section 112.

The enlargement/reduction processing section 112 enlarges or reduces the monocular images supplied from the inversion processing section 111, in accordance with an externally inputted control signal, and causes the buffer 64 to store the obtained monocular images. The control signal inputted to the enlargement/reduction processing section 112 is supplied from a function section (not shown) which determines the size of each of the monocular images on the basis of, for example, the distance to a subject and the size of a I/O display located on an image display side where a stereoscopic image is to be reproduced.

The monocular images stored in the buffer 64 are compressed by the compression/expansion processing section 65 of FIG. 18 and are transmitted to an information processing apparatus which controls another I/O display. Namely, FIG. 34 shows an example in which inversion processing and enlargement/reduction processing of the monocular images are performed in the information processing apparatus 31 which controls the I/O display located on the image capture side.

The image processing performed in step S4 of FIG. 19 will be described below with reference to the flowchart of FIG. 35.

After the monocular images have been generated by the monocular image generation section 62, the inversion processing section 111 of the image processing section 63 subjects the monocular images supplied from the monocular image generation section 62 to inversion processing centered about the respective optical axes of the microlenses which form the corresponding monocular images on the respective display areas, and outputs the obtained monocular images to the enlargement/reduction processing section 112.

In step S22, the enlargement/reduction processing section 112 enlarges or reduces the monocular images supplied from the inversion processing section 111 in accordance with the externally inputted control signal, and causes the buffer 64 to store the obtained monocular images. After that, the process returns to the step S4 of FIG. 19, and the subsequent processing is performed.

Figure 35:
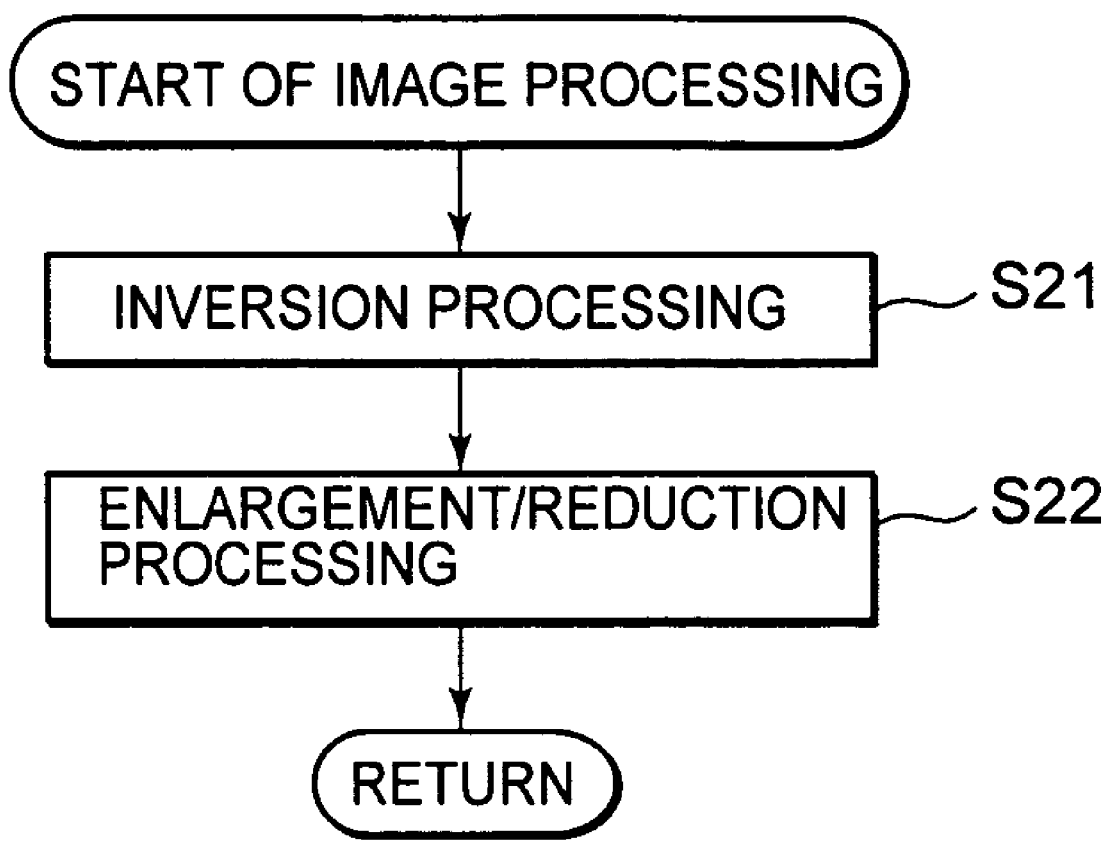
FIG. 35 is a flowchart illustrating an image processing performed in step S4 of FIG. 19.

In the above-mentioned flowchart, the construction shown in FIG. 34 is disposed in the information processing apparatus 31 located on the image capture side and performs the processing shown in FIG. 35. However, in the case where image processing is performed during image display, the construction of the information processing apparatus 31 is as shown in FIG. 36.

In FIG. 36, the same reference numerals are used to denote the same constituent elements as those shown in FIG. 18. As shown in FIG. 36, in the case where image processing is performed during image display, the image processing section 63 which is disposed between the monocular image generation section 62 and the buffer 64 in FIG. 18 is disposed between the compression/expansion processing section 65 and the buffer 67.

This image processing section 63 has a construction similar to the construction shown in FIG. 34, and applies inversion processing and enlargement/reduction processing to monocular images supplied to the image processing section 63, and causes the buffer 67 to store the obtained monocular images.

According to this construction, the information processing apparatus 31 located on a monocular-image receiving side can be made to perform image processing during the display of monocular images.

The above-description has referred to the case where image processing to be performed in addition to inversion processing is enlargement/reduction processing, but if the shapes of monocular images are deformed or the display positions of monocular images are moved, a stereoscopic image which looks different compared to the case where neither the deformation processing nor the movement processing is performed can be provided to a user who is an observer.

Figure 37:
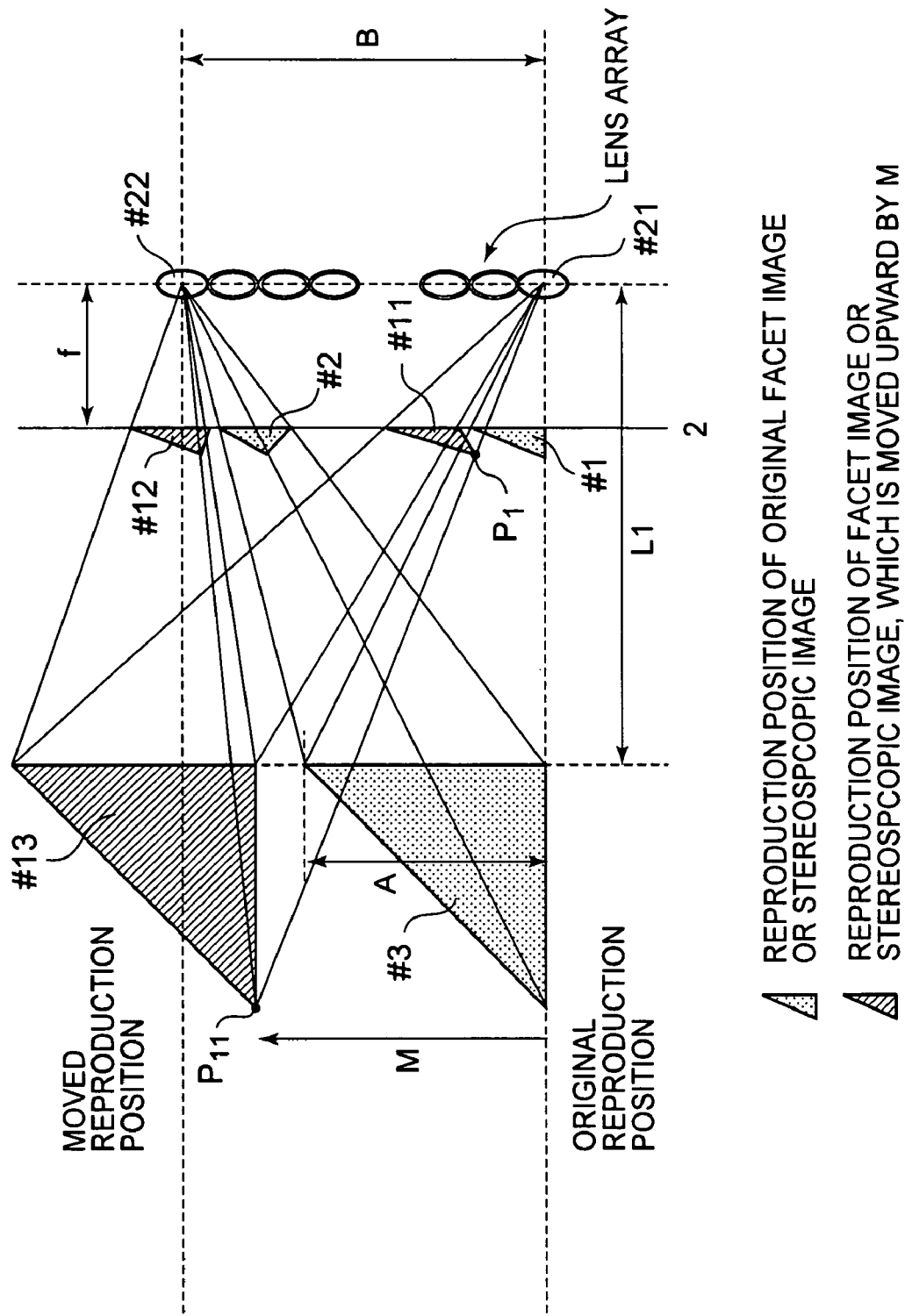
FIG. 37 a view showing principles of a reproduction example of a stereoscopic image.

FIG. 37 is a view showing principles which make it possible to move the reproduction position of a stereoscopic image.

In FIG. 37, the same reference numerals are used to denote sections corresponding to those shown in FIG. 33. Namely, the triangle #1 which is a gray colored triangle represents a monocular image subjected to only inversion processing, and the triangle #2 represents a stereoscopic image subjected to not only inversion processing but also deformation processing. The triangle #3 represents a stereoscopic image which is reproduced by the triangles #1 and #2 (which seems to an observer to be reproduced by the triangles #1 and #2).

The triangles #11 and #12 which are hatched triangles represent monocular images subjected to not only inversion processing but also deformation processing, and the triangle #13 represents a stereoscopic image which is reproduced by the triangles #11 and #12.

In this case, as shown in FIG. 37, when the triangles #11 and #12 subjected to predetermined deformation processing are respectively displayed at locations above the positions of the corresponding triangles #1 and #2, light rays which reach the eyes of the user #2 via the respective microlenses #21 and #22 are virtually the same as light rays which leave the triangle #13 located at a position moved up by a distance M from the original reproduction position. For example, if the triangle 11# is displayed, a light ray which reaches the eyes of the user #2 from the point $P_{11}$ of the triangle 13# is reproduced by a light ray which reaches the eyes of the user #2 from the point $P_1$ of the triangle 11#. Accordingly, the user #2 can virtually view the triangle 13# whose reproduction position is moved.

Each of the height of the triangle #3 whose reproduction position has not yet been moved and the height of the triangle 13# whose reproduction position has been moved is A. The reproduction of this stereoscopic image is realized by assuming the position, the size and the shape of a stereoscopic image to be reproduced and finding through an arithmetic operation how each of monocular images is to be deformed and by which pixels the respective monocular images are to be displayed, in order to reproduce the stereoscopic image at the position without changing the size and the shape of the stereoscopic image itself compared to a stereoscopic image (original stereoscopic image) to be reproduced when undeformed monocular images are displayed.

Figure 38:
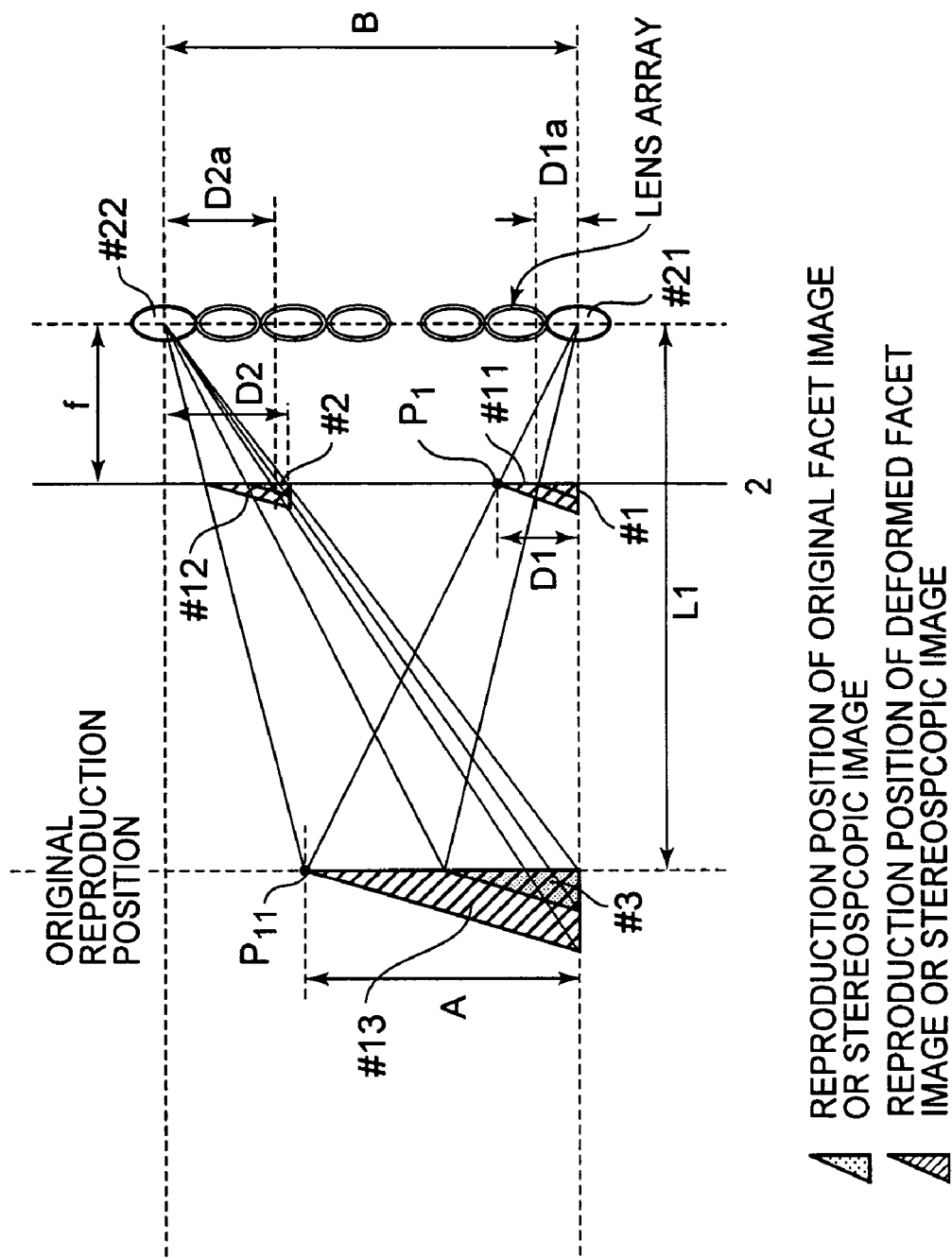
FIG. 38 is another view showing principles of a reproduction example of a stereoscopic image.

FIG. 38 is a view showing principles which reproduce an enlarged stereoscopic image at the same position as the reproduction position of the original stereoscopic image.

In FIG. 38, the same reference numerals are used to denote sections corresponding to those shown in FIG. 33. Namely, the triangles #1 and #2 which are gray colored triangles represent monocular image subjected to only inversion processing, and the triangle #3 represents a stereoscopic image which is reproduced by the triangles #1 and #2 (which seems to an observer to be reproduced by the triangles #1 and #2). The triangles #1 and #2 have the same size.

The triangles #11 and #12 which are hatched triangles represent monocular images subjected to not only inversion processing but also deformation processing, and the triangle #13 represents a stereoscopic image which is reproduced by the triangles #11 and #12. In this example, the triangle 11# is deformed so that the length of the base of and the height of the triangle #1 become large, while the triangle #12 is deformed so that the height of the triangle #2 becomes large with the length of the base of the triangle #2 remaining approximately the same.

In FIG. 38, symbol f denotes the distance from the lens array plane to the display surface of the I/O display 2, and the following description focuses on light rays which reach the eyes of the user #2, who is an observer, via the microlenses #21 and #22.

As shown in FIG. 38, when the triangles #11 and #12 are displayed, light rays which reach the eyes of the user #2 via the respective microlenses #21 and #22 are virtually the same as light rays which leave the triangle #13 which is approximately equal to a triangle obtained by enlarging the triangle #3 which is an original stereoscopic image to be reproduced. For example, if the triangle 11# is displayed, a light ray which reaches the eyes of the user #2 from the point $P_{11}$ of the triangle 13# is reproduced by a light ray which reaches the eyes of the user #2 from the point $P_1$ of the triangle 11#. Accordingly, the user #2 can virtually view this enlarged triangle 13#.

Similarly, if monocular images obtained by predetermined deformation processing are displayed, a triangle obtained by reducing the triangle #3 which is an original stereoscopic image to be reproduced can be presented to the user #2.

Accordingly, by applying deformation processing and the like to individual monocular images, it is possible to present a stereoscopic image reproduced at a position different from an original reproduction position, to a user who is an observer (FIG. 37). In addition, it is also possible to present an enlarged or reproduced stereoscopic image at the same position as the original reproduction position (FIG. 38).

This image processing is also performed in the information processing apparatus located on the image capture side or the image display side. As a matter of course, part of the above-mentioned image processing may be performed on the image capture side, and the other may also be performed on the image display side.

The above-mentioned sequence of processing can be executed by hardware, but can also be executed by software.

If the sequence of processing is to be executed by software, a program which constitutes the software is installed from a network or a recording medium into a computer incorporated in dedicated hardware, or into, for example, a general-purpose computer into which various programs can be installed so as to execute various kinds of functions.

This recording medium may be made of the removable medium 51 as shown in FIG. 17, which is a program-recorded medium to be distributed to users separately from the apparatus in order to provide a program to the users, for example, a magnetic disk (including a flexible disk), an optical disk (including a CD-ROM (Compact Disk-Read Only Memory) and a DVD {Digital Versatile Disk)}, a magnetooptical disk {including MD (registered trademark) (Mini-Disk)} or a semiconductor memory. Otherwise, the recording medium may be made of the program-recorded ROM 42 which is to be provided to users in the state of being incorporated in the apparatus in advance, or the hard disk drive included in the storage section 48.

In addition, the steps described herein includes not only processing which is performed in a time-series manner in accordance with the described order, but also processing which is not necessarily processed in a time-series manner but is executed in parallel or individually.

In addition, the term "system" used herein represents the entire apparatus made of a plurality of devices.

The present invention contains subject matter related to Japanese Patent Applications JP2004-080031 and JP2004-153017, filed in the Japanese Patent Office on Mar. 19, 2004 and May 24, 2004, respectively, the entire contents of which being incorporated herein by reference.

It should be understood by those skilled in the art that various modifications, combinations, sub-combinations and alterations may occur factors insofar as they are within the scope of the appended claims or the equivalents thereof.

What is claimed is:

1. An information processing apparatus for controlling a display device, which is constituted by pixels each switchable between an image display operation and an image capture operation according to an applied voltage and has a lens array provided on a surface of the display device, comprising:

means for acquiring a subject image by combining a plurality of monocular images each captured by one of a plurality of image capture areas, each image capture area including a plurality of pixels for image capture operation;

means for preventing light rays captured by one of the image capture areas through a corresponding lens of the lens array from interfering with light rays captured by an adjacent image capture area through an adjacent lens of the lens array;

means for preventing light exiting from a pixel configured to perform a display operation from entering an adjacent pixel configured to perform an image capture operation;

means for transmitting data of said subject image to an other information processing apparatus controlling an other display device having a same construction as said display device;

means for receiving data of an other subject image transmitted from said other information processing apparatus; and means for displaying, on the basis of said data of said other subject image, said other subject image in a display area, including a plurality of pixels for image display operation, at a position corresponding to a position of said other display device where said other subject image is formed, the plurality of pixels for image display being arranged in image display rows alternating with image capture rows of pixels for performing an image capture operation, the image display rows switching positions with the image capture row positions at a predetermined rate.

2. The information processing apparatus according to claim 1, wherein
said display control means displays a plurality of images of said other subject in a plurality of said display areas on the basis of data of a plurality of images of said other subject received by said reception means.

3. The information processing apparatus according to claim 1, further comprising:
conversion means for converting said image of said subject acquired by said acquisition means into an erected image; wherein said transmission means transmits data of said erected image of said subject converted by said conversion means to said other information processing apparatus.

4. The information processing apparatus according to claim 3, further comprising:

enlargement/reduction processing means for enlarging or reducing said image of said subject which is converted into said erected image by said conversion means.

5. The information processing apparatus according to claim 1, further comprising:

conversion means for converting said image of said other subject whose data is received by said reception means into an erected image; wherein said display control means displays said erected image of said other subject converted by said conversion means in said display area.

6. The information processing apparatus according to claim 5, further comprising:

enlargement/reduction processing means for enlarging or reducing said image of said subject which is converted into said erected image by said conversion means.

7. The information processing apparatus according to the claim 1, further comprising:

compression means for compressing data of a first image of said subject acquired by said acquisition means, by using a difference between said first image of said subject and a second image of said subject which serves as a reference; wherein said transmission means transmits said data of said first image of said subject compressed by said compression means to said other information processing apparatus together with data of said second image of said subject.

8. The information processing apparatus according to the claim 1, further comprising:

generation means for generating data of a second image of said other subject on the basis of data of a first image of said other subject and a difference between said first and second images of said other subject if said reception means receives said data of said first image of said other subject which serves as a reference, and said data of said second image of said other subject represented by a difference from said first image of said other subject.

9. The information processing apparatus according to claim 1, wherein said lens array includes a plurality of microlenses, and
each image capture area of the plurality of image capture areas includes one microlens arranged over the plurality of pixels.

10. The information processing apparatus according to claim 1, wherein in said acquisition means at least one monocular image of the plurality of monocular images is formed in each image capture area of the plurality of image capture areas.

11. An information processing method of an information processing apparatus for controlling a display device which is constituted by pixels each switchable between an image display operation and an image capture operation according to an applied voltage and has a lens array provided on a surface of the display device, comprising:

acquiring a subject image by combining a plurality of monocular images each captured by one of a plurality of image capture areas, each image capture area including a plurality of pixels for image capture operation;

preventing light rays captured by one of the image capture areas through a corresponding lens of the lens array from interfering with light rays captured by an adjacent image capture area through an adjacent lens of the lens array;

preventing light rays exiting a pixel configured to perform a display operation from entering an adjacent pixel configured to perform an image capture operation;

transmitting data of said subject image to an other information processing apparatus controlling an other display device having a same construction as said display device;

receiving data of an other subject image transmitted from said other information processing apparatus; and displaying, on the basis of said data of said other subject image, said other subject image in a display area including a plurality of pixels for image display operation, the plurality of pixels for image display operation being arranged in image display rows alternating with image capture rows of pixels for performing an image capture operation;

switching the image display rows positions with the image capture row positions at a predetermined rate; and forming said other subject image at a position of said display device corresponding to a position of said other display device where said other subject image formed.

12. The information processing method according to claim 11, wherein in said acquisition, at least one monocular image of the plurality of monocular images is formed in each image capture area of the plurality of image capture areas.

13. A computer-readable storage medium encoded with computer-readable instructions for controlling a display device, which is constituted by pixels each switchable between an image display operation and an image capture operation according to an applied voltage and has a lens array provided on a surface of the display device, the instructions when executed by a computer cause the computer to perform a method, comprising:

acquiring a subject image by combining a plurality of monocular images each captured by one of a plurality of image capture areas, each image capture area including a plurality of pixels for image capture operation;

preventing light rays captured by one of the image capture areas through a corresponding lens of the lens array from interfering with light rays captured by an adjacent image capture area through an adjacent lens of the lens array;

preventing light rays exiting a pixel configured to perform a display operation from entering an adjacent pixel configured to perform an image capture operation;

transmitting data of said subject image to an other information processing apparatus controlling an other display device having a same construction as said display device;

receiving data of an other subject image transmitted from said other information processing apparatus;

displaying, on the basis of said data of said other subject image, said other subject image in a display area including a plurality of pixels for image display operation at a position corresponding to a position of said other display device where said other subject image formed, the plurality of pixels for image display operation being arranged in image display rows alternating with image capture rows of pixels for performing an image capture operation; and switching the image display rows positions with the image capture row positions at a predetermined rate.

14. The computer-readable storage medium encoded with computer readable instruction according to claim 13, wherein in the acquisition, at least one monocular image of the plurality of monocular images is formed in each image capture area of the plurality of image capture areas.

15. An information processing apparatus for controlling a display device, which is constituted by pixels each switchable between an image display operation and an image capture operation according to an applied voltage and has a lens array provided on a surface of the display device, comprising:
- means for acquiring a subject image by combining a plurality of monocular images each captured by one of a plurality of image capture areas, each image capture area including a plurality of pixels for image capture operation arranged in image capture rows alternating with image display rows of pixels configured to perform a display operation, the image capture row positions and the image display row positions being switched at a predetermined rate;
- means for preventing light rays captured by one of the image capture areas through a corresponding lens of the lens array from interfering with light rays captured by an adjacent image capture area through an adjacent lens of the lens array;
- means for preventing light exiting from a pixel configured to perform a display operation from entering an adjacent pixel configured to perform an image capture operation; and
- transmission means for transmitting data of said subject image to an other information processing apparatus controlling an other display device having a same construction as said display device.

16. An information processing method of an information processing apparatus for controlling a display device, which is constituted by pixels each switchable between an image display operation and an image capture operation according to an applied voltage and has a lens array provided on a surface of the display device, comprising:
- acquiring a subject image by combining a plurality of monocular images each captured by one of a plurality of image capture areas, each image capture area including a plurality of pixels for image capture operation arranged in image capture rows alternating with image display rows of pixels configured to perform a display operation, the image capture row positions and the image display row positions being switched at a predetermined rate;
- preventing light rays captured by one of the image capture areas through a corresponding lens of the lens array from interfering with light rays captured by an adjacent image capture area through an adjacent lens of the lens array;
- preventing light rays exiting a pixel configured to perform a display operation from entering an adjacent pixel configured to perform an image capture operation; and
- transmitting data of said subject image to an other information processing apparatus controlling an other display device having a same construction as said display device.

17. A computer-readable storage medium encoded with computer-readable instructions for controlling a display device, which is constituted by pixels each switchable between an image display operation and an image capture operation according to an applied voltage and has a lens array provided on a surface of the display device, the instructions when executed by a computer cause the computer to perform a method, comprising:
- acquiring a subject image by combining a plurality of monocular images each captured by one of a plurality of image capture areas, each image capture area including a plurality of pixels for image capture operation arranged in image capture rows alternating with image display rows of pixels configured to perform a display operation, the image capture row positions and the image display row positions being switched at a predetermined rate;
- preventing light rays captured by one of the image capture areas through a corresponding lens of the lens array from interfering with light rays captured by an adjacent image capture area through an adjacent lens of the lens array;
- preventing light rays exiting the pixel configured to perform a display operation from entering an adjacent pixel configured to perform an image capture operation; and
- transmitting data of said subject image to an other information processing apparatus controlling an other display device having a same construction as said display device.

18. An information processing apparatus for controlling a display device, which is constituted by pixels each switchable between an image display operation and an image capture operation according to an applied voltage and has a lens array provided on a surface of the display device, comprising:
- means for receiving data of an other subject image transmitted from an other information processing apparatus which controls an other display device having a same construction as said display device;
- means for displaying, on the basis of said data of said other subject image, said other subject image in a display area including a plurality of pixels for image display operation at a position corresponding to a position of said other display device where said other subject image is formed, the pixels for image display operation being arranged in image display rows alternating with image capture rows of pixels configured to perform an image capture operation, the image display row positions and the image capture row positions being switched at a predetermined rate; and
- means for preventing light exiting from a pixel configured to perform a display operation from entering an adjacent pixel configured to perform an image capture operation.

19. An information processing method of an information processing apparatus for controlling a display device, which is constituted by pixels each switchable between an image display operation and an image capture operation according to an applied voltage and has a lens array provided on a surface of the display device, comprising:
- receiving data of an other subject image transmitted from an other information processing apparatus which controls an other display device having a same construction as said display device;
- displaying, on the basis of said data of said other subject image, said other subject image in a display area including a plurality of pixels for image display operation at a position corresponding to a position of said other display device where said other subject image is formed, the pixels for image display operation being arranged in image display rows alternating with image capture rows of pixels configured to perform an image capture operation, the image display row positions and the image capture row positions being switched at a predetermined rate; and
- preventing light rays exiting a pixel configured to perform a display operation from entering an adjacent pixel configured to perform an image capture operation.

20. A computer-readable storage medium encoded with computer-readable instructions for controlling a display device, which is constituted by pixels each switchable between an image display operation and an image capture operation according to an applied voltage and has a lens array provided on a surface of the display device, the instructions when executed by a computer cause the computer to perform a method, comprising:

receiving data of an other subject image transmitted from an other information processing apparatus which controls an other display device having a same construction as said display device;

displaying, on the basis of said data of said other subject image, said other subject image in a display area including a plurality of pixels for image display operation at a position corresponding to a position of said other display device where said other subject image is formed, the pixels for image display operation being arranged in image display rows alternating with image capture rows of pixels configured to perform an image capture operation, the image display row positions and the image capture row positions being switched at a predetermined rate; and preventing light rays exiting a pixel configured to perform a display operation from entering an adjacent pixel configured to perform an image capture operation.

21. A display device, comprising:

a plurality of pixels each switchable between an image display operation and an image capture operation according to an applied voltage;

a lens array provided on a surface of the display device and configured to focus a plurality of monocular images on a plurality of image capture areas, each image capture area including a subset of the plurality of pixels configured to perform a capture operation; and a separation layer disposed between the lens array and the plurality of pixels and configured to prevent light rays captured by one of the image capture areas through a lens of the lens array from interfering with light rays captured by an adjacent image capture area through an adjacent lens of the lens array, the separation layer preventing light rays exiting a pixel configured for performing a display operation from entering an adjacent pixel configured for performing an image capture operation, wherein said display device is configured to output to an information processing apparatus a signal indicative of a subject image acquired by combining a plurality of monocular images, and is configured to display a predetermined image in a display area made of a plurality of pixels for image display operation arranged in image display rows alternating with image capture rows of pixels configured to perform an image capture operation, in accordance with control performed by said information processing apparatus, and the image display row positions and the image capture row positions are switched at a predetermined rate.

* * * * *